United States Patent [19]

Sartorio et al.

[11] Patent Number: 5,005,394

[45] Date of Patent: Apr. 9, 1991

[54] PROGRAMMING SYSTEM FOR THE SINGLE ARM BENDING ROBOT

[75] Inventors: Franco Sartorio; Fabrizio Grassi; Gianpaolo Prunotto; Francesco Sgandurra, all of Turin, Italy

[73] Assignee: Amada Company, Limited

[21] Appl. No.: 284,440

[22] Filed: Dec. 14, 1988

[30] Foreign Application Priority Data

Dec. 15, 1987 [IT] Italy .............................. 68073 A/87
Dec. 15, 1987 [IT] Italy .............................. 68074 A/87

[51] Int. Cl.$^5$ .......................................... B21J 13/10
[52] U.S. Cl. .......................................... 72/10; 72/12; 72/21; 72/389; 72/420; 72/421; 414/735; 364/476
[58] Field of Search ................. 72/420, 421, 422, 389, 72/414, 10, 12, 21

[56] References Cited

U.S. PATENT DOCUMENTS

| | | | |
|---|---|---|---|
| 4,399,675 | 8/1983 | Erdmann et al. | 72/420 |
| 4,557,133 | 12/1985 | Mikusch et al. | 72/422 |
| 4,557,135 | 12/1985 | Ragettli et al. | 72/420 |
| 4,708,573 | 11/1987 | Hug | 72/420 |
| 4,827,757 | 5/1989 | Sartorio | 72/420 |
| 4,864,509 | 9/1989 | Somerville et al. | 72/389 |

FOREIGN PATENT DOCUMENTS

| | | |
|---|---|---|
| 110655 | 6/1984 | European Pat. Off. . |
| 3407445 | 9/1985 | Fed. Rep. of Germany . |
| 3714855 | 11/1988 | Fed. Rep. of Germany ........ 72/420 |
| 2584634 | 1/1987 | France . |
| 2608947 | 7/1988 | France . |
| 2177676 | 1/1987 | United Kingdom . |

*Primary Examiner*—David Jones
*Attorney, Agent, or Firm*—Wigman & Cohen

[57] ABSTRACT

A device for controlling a manipulator for handling a workpiece processed by a press brake. The press brake is equipped with a side sensor for detecting the horizontal X-axis direction positions parallel to the longitudinal direction of the upper and lower dies of the press brake. The manipulator is arranged to be movable in the X-axis direction and the head of the manipulator is arranged to be rotatable about first and second shafts of the manipulator. The device includes apparatus for inputting a position of the workpiece for an initial bending stage and apparatus for inputting an angle of rotation of the workpiece about the first and/or second shafts of the manipulator for each of a plurality of bending stages. Apparatus for sequentially calculating a position of the workpiece for the second and subsequent bending stages, based on the initial input of the workpiece which is input from the workpiece initial position input means, and the angle of rotation of the workpiece about the first and/or second shafts at each of the bending stages which is input from the workpiece rotation angle input means is inputted from the workpiece rotation angle input means is inputted is included in the device.

15 Claims, 29 Drawing Sheets

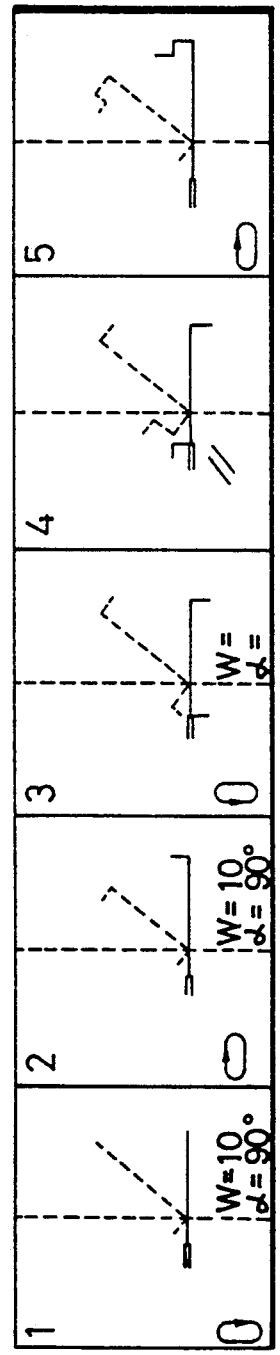
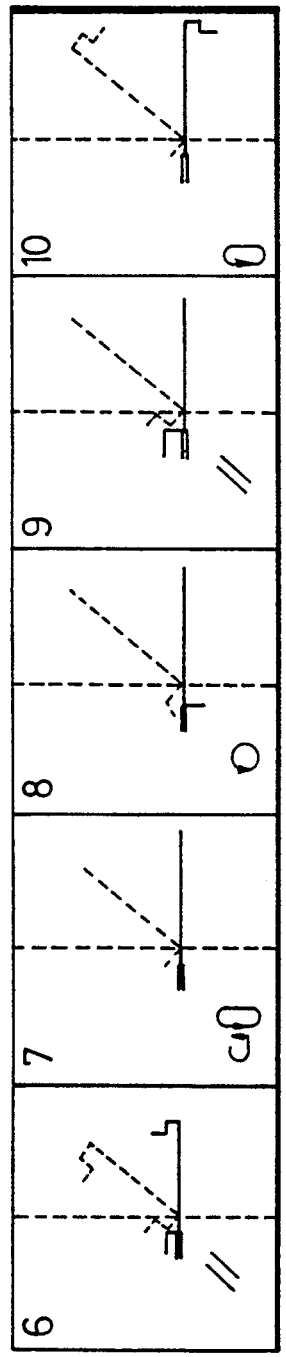
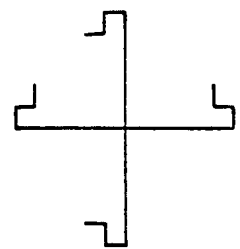
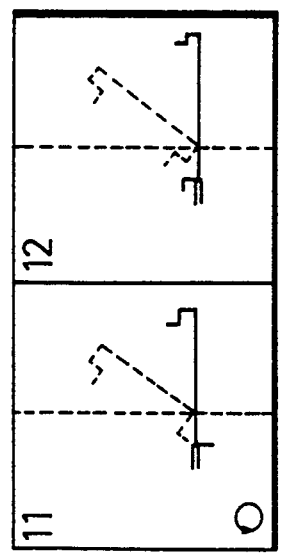
FIG.14b

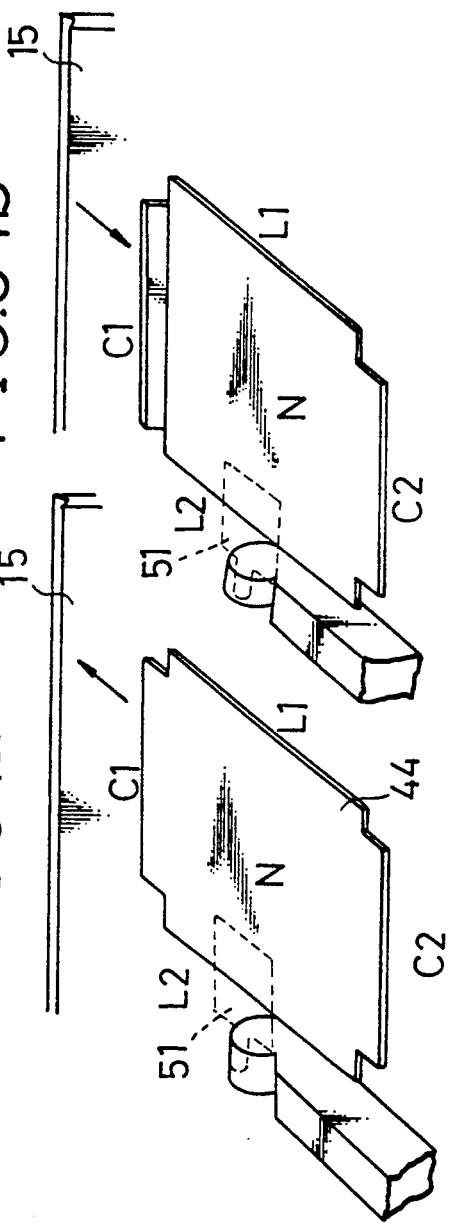
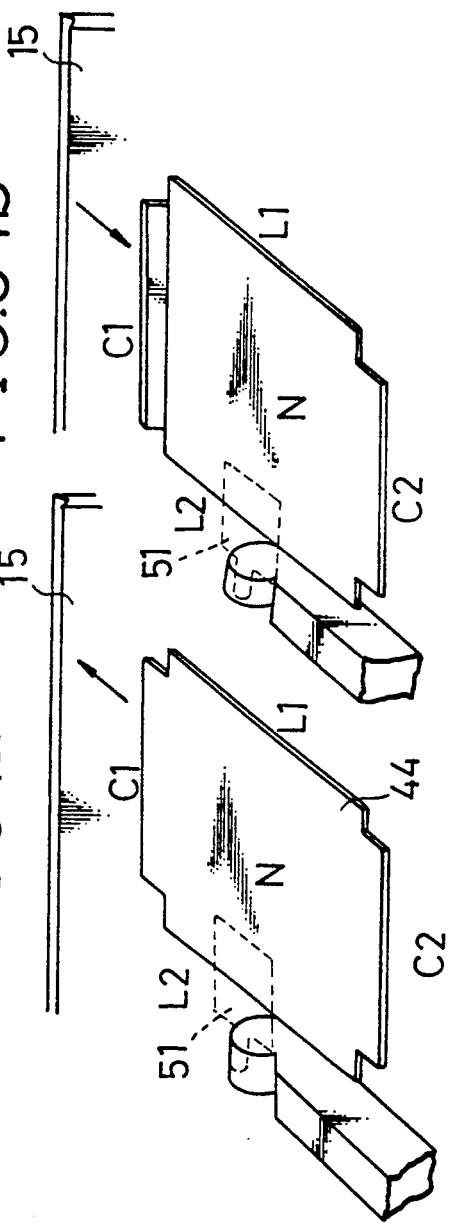
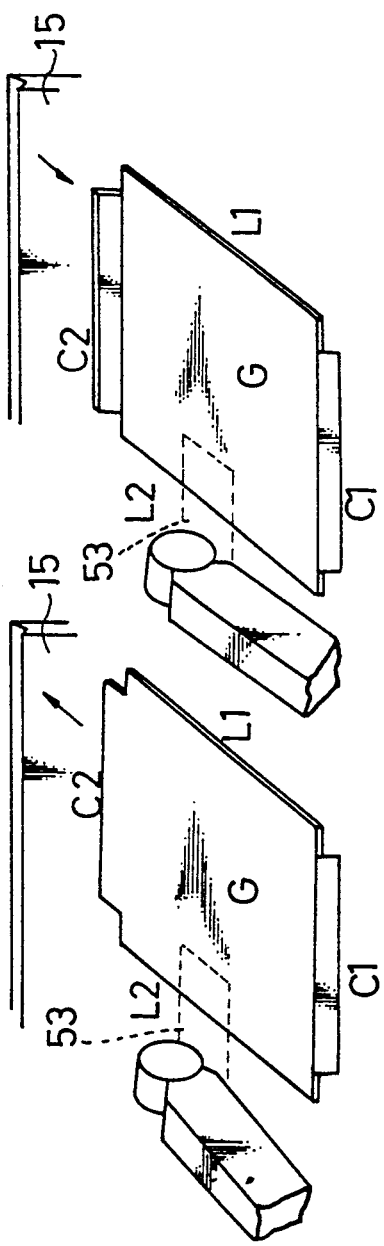
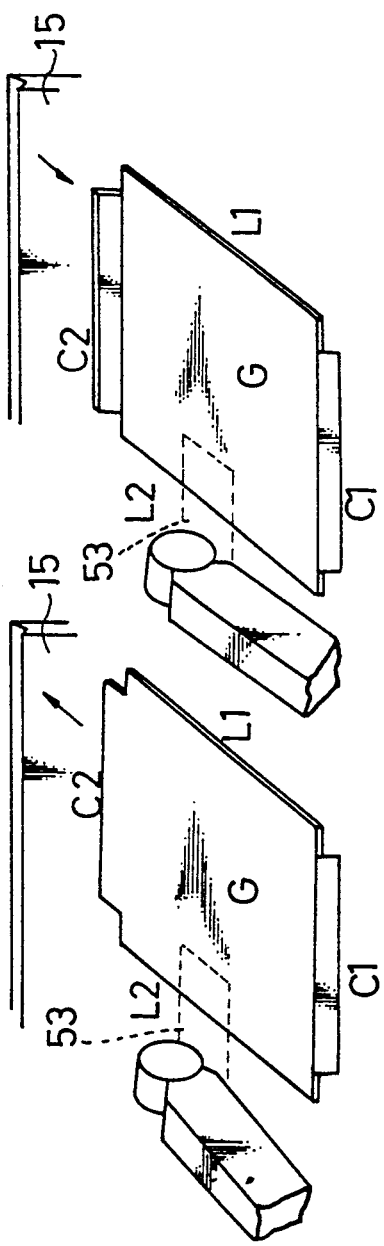

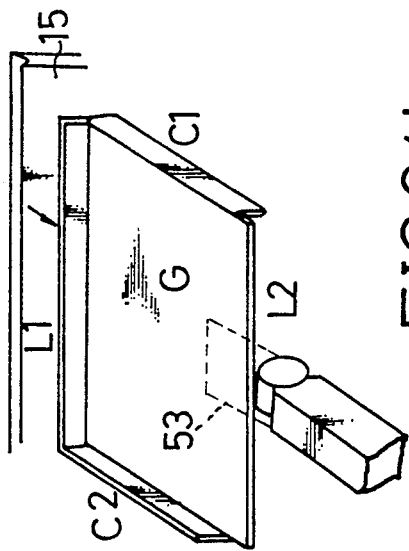
FIG.34e FIG.34f
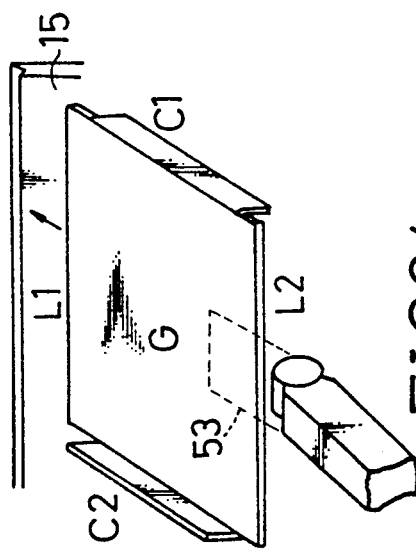
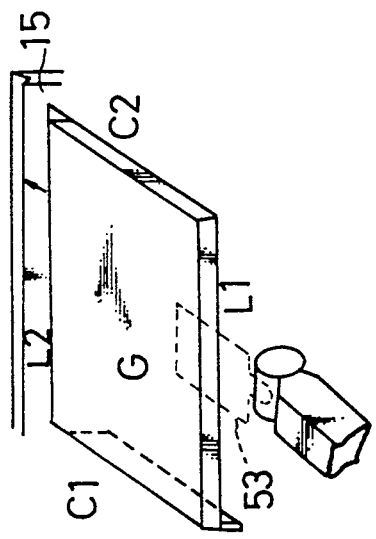
FIG.34g FIG.34h

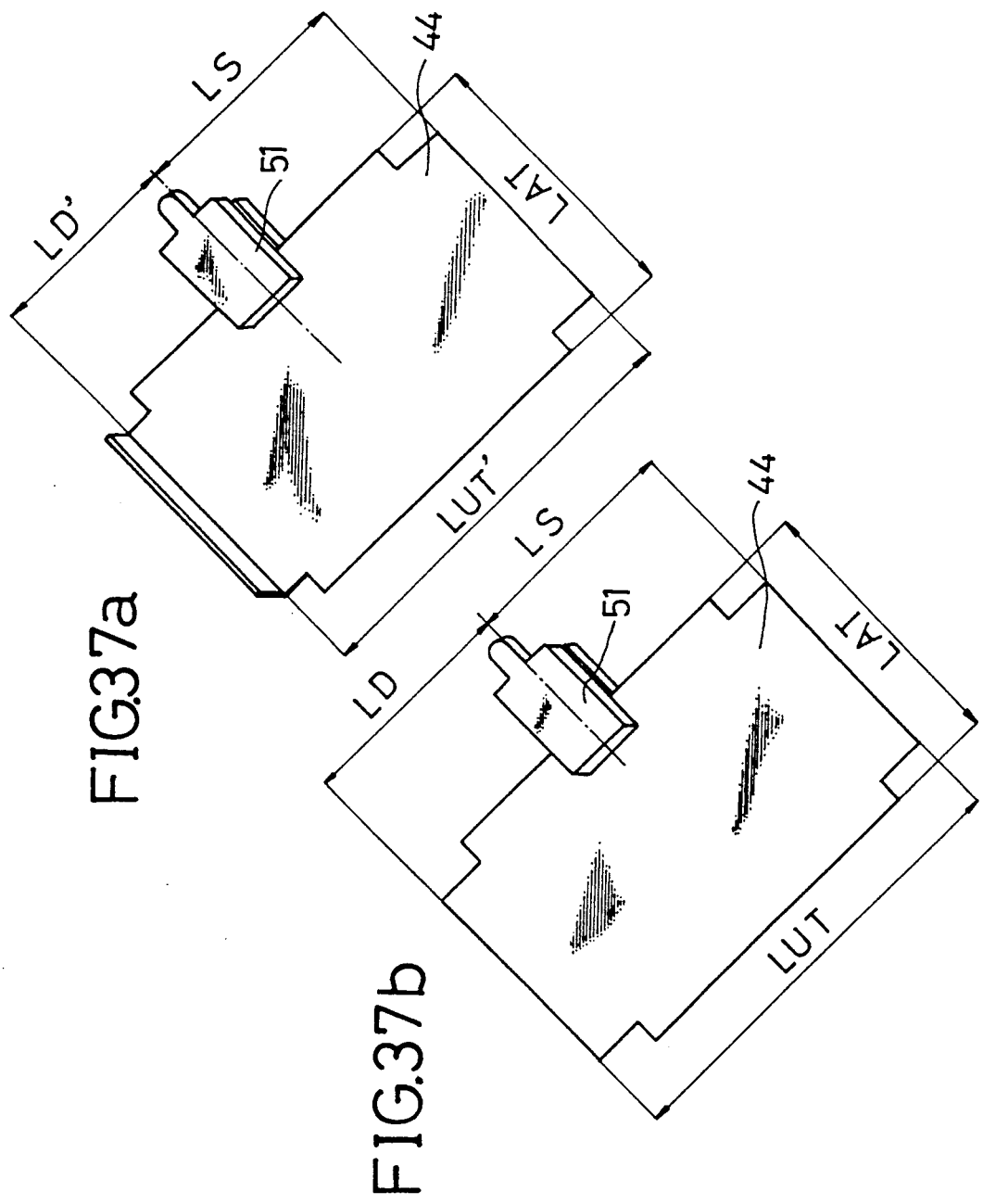

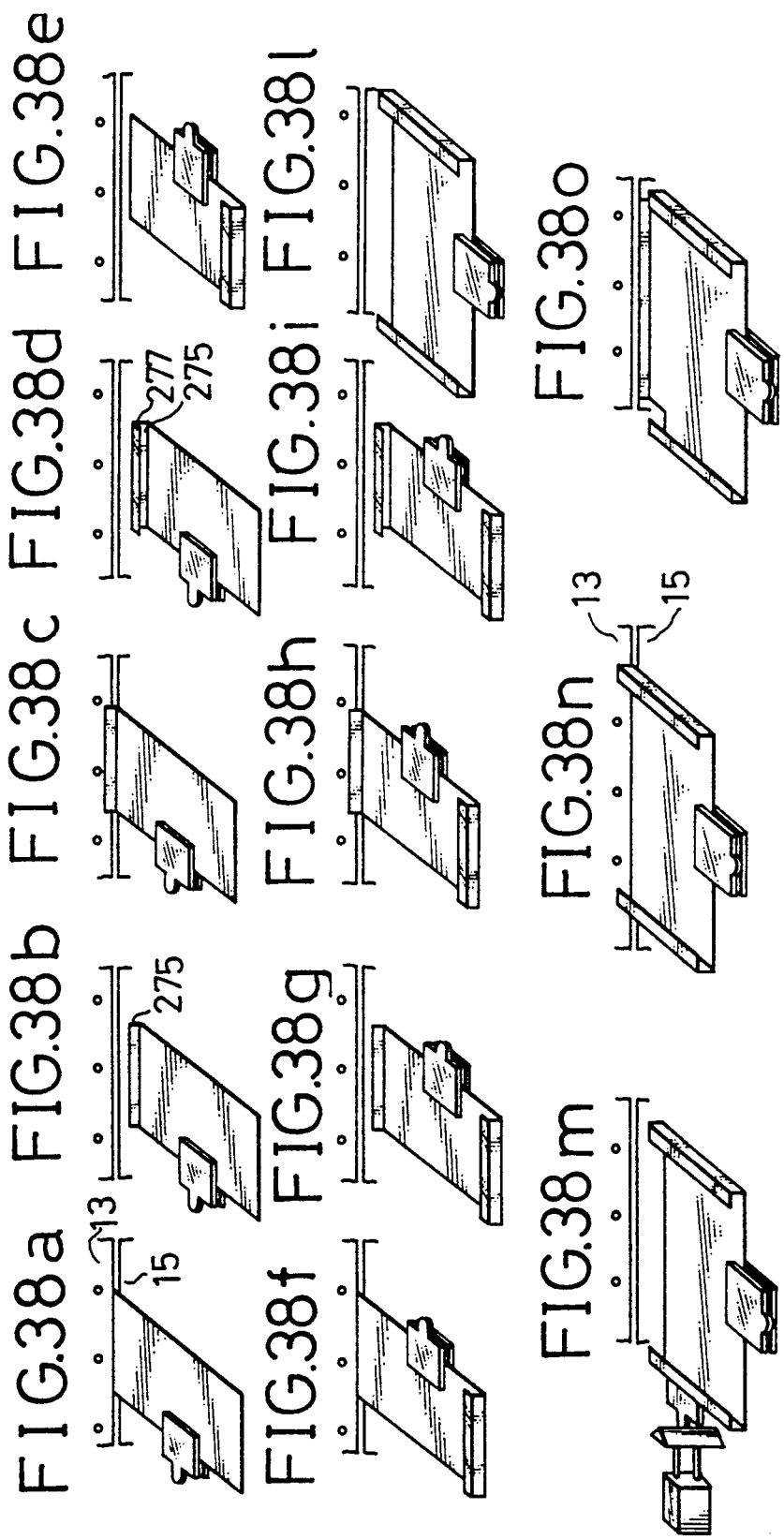

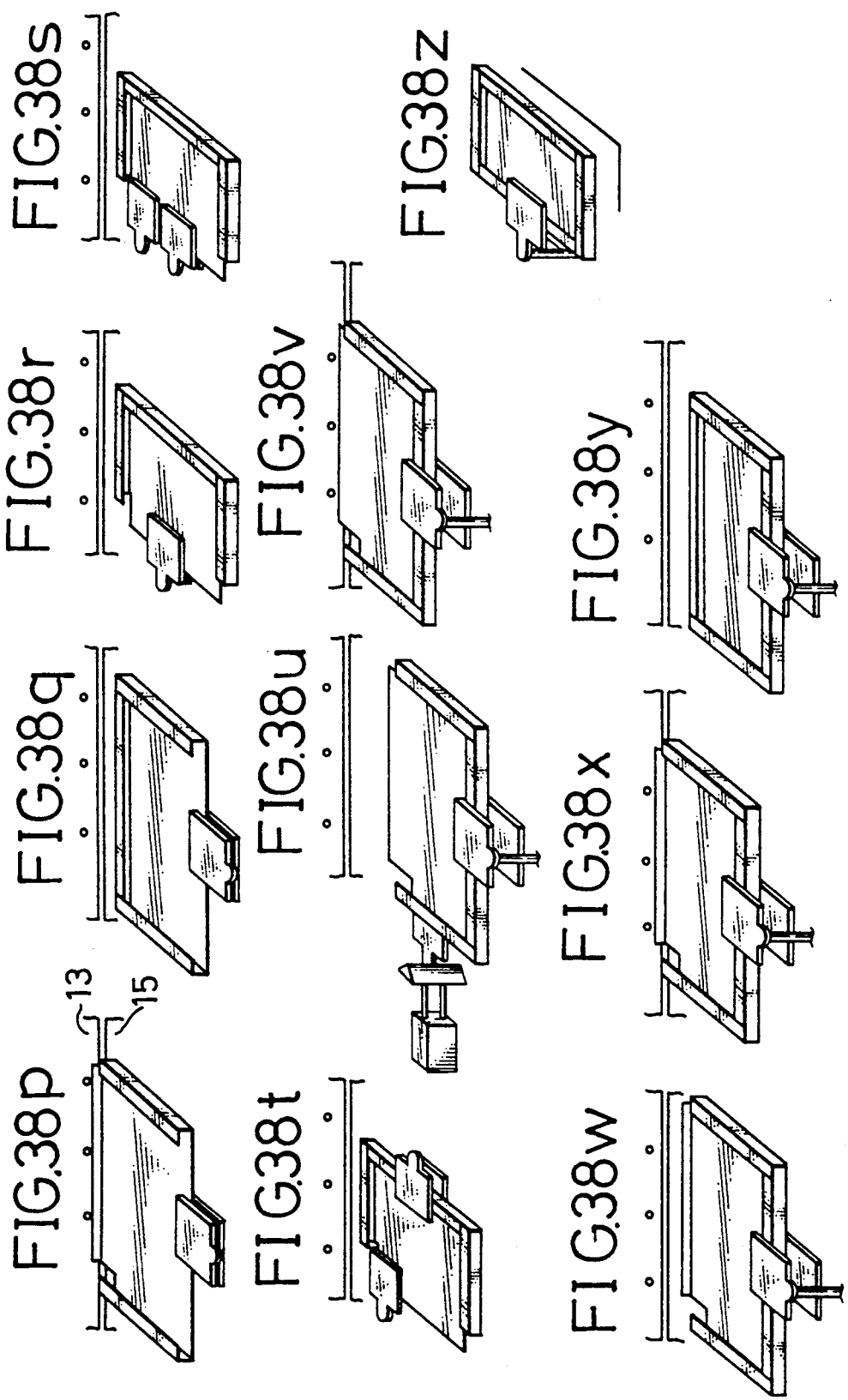

PROGRAMMING SYSTEM FOR THE SINGLE ARM BENDING ROBOT

BACKGROUND OF THE INVENTION

1. Field of the Invention

The present invention relates to a control device and a control method for a manipulator capable of handling a plate material which is subjected to a bending process in a bending machine such as a press break or the like.

2. Description of the Prior Art

Conventionally, a manipulator has been developed for automatically handling the workpiece in a plate bending machine such as a press break, where a plate bending operation is performed, in order to automate this process.

A conventional manipulator usually comprises an industrial robot. A conventional manipulator is generally set up in a prescribed position in front of the bending process machine. In this type of manipulator the arm is installed on a supporting column in a manner to allow both free vertical and rotary movement, and also to provide free telescopic motion, and rotation. A plate clamping device is provided on the end of the arm for freely grasping a workpiece.

In a conventional manipulator with the abovementioned configuration, for the plate clamping device to have a wide range of movement, the arm must be long and the overall configuration results in a large manipulator, which is a drawback. In addition, the positioning of a plate in the plate bending device of the plate bending process machine is performed entirely by the manipulator. It is therefore necessary to construct a high-precision manipulator to improve the precision of the positioning of the plate. This leads to the problem of excessively high production costs.

The inventor of the present invention, with due consideration to these problem, has disclosed, in Japanese Patent No. Sho-62-313760, an improved manipulator for handling plate material in a plate bending machine such as the press break. This manipulator grasps the plate material and causes the clamped plate to turn over and rotate around an axis perpendicular to the plate surface Accordingly, in the case where the plate is bent in more than one place, successive scheduled bending points can be provided to the plate bending machine, depending on the bending stage. However, it is necessary to know the position of the plate in each bending stage for easy and rapid provision to the plate bending machine of a prescribed bending place of the plate.

Accordingly, there is the inconvenience that the one at a time input of the data on the position of the plate is troublesome.

SUMMARY OF THE INVENTION

An object of the present invention is to provide, with due consideration to the drawbacks of such conventional devices, a control device and a control method for a manipulator for a plate bending machine which is capable of providing easily and quickly the data on the position of the plate in each bending stage to the manipulator by only inputting the amount of the rotation of the plate and the requirement for reversal of the plate in each bending stage.

This object is achieved in the present invention by the provision of a control device for a manipulator for a plate bending machine comprising an input means for inputting the amount of rotation of the plate and the requirement for reversal of the plate in each bending stage; a plate position calculation means for successive calculations of the plate position in the second and subsequent bending stages, based on the amount of rotation of the plate and the requirement for reversal of the plate in each bending stage, and the position of the plate in the initial bending stage; and a control signal generating means for generating a control signal for the manipulator, based on data for the plate position in each bending stage, parameters relating to (1) the plate, (2) the bending machine and (3) the manipulator, such as the dimensions of the plate, and the dimension of the members of the plate bending machine and that of the manipulator.

In addition, the control method of the manipulator for the plate bending machine of the present invention comprises the steps of inputting the amount of rotation of the plate and the requirement for reversal of the plate in each bending stage; successive calculation of the plate position in the second and subserquent bending stages, based on the input of the amount of rotation of the plate surface and the requirement for reversal of the plate surface in each bending stage, and the position of the plate in the initial bending stage; and generation of a control signal for the manipulator, based on the calculated plate position and the parameters relating to the plate, the bending machine and the manipulator.

In the control device and control method of the present invention, the position of the plate in each bending stage is determined based on the amount of rotation of the plate and the requirement for reversal of the plate in each bending stage, and the position of the plate in the initial bending stage. Accordingly, prescribed bending process can easily and quickly be carried out by inputting the amount of the rotation of the plate and the requirement for reversal of the plate in each bending stage. That is to say, the one at a time input of the data on the position of the plate is not needed.

BRIEF DESCRIPTION OF THE DRAWINGS

These and other objects, features, and advantages of the present invention will become more apparent from the following description of the preferred embodiments taken in conjunction with the accompanying drawings, in which:

FIG. 14a and FIG. 14b show an another bending stage diagram.

FIGS. 34a, to 34h illustrate plate positions in the bending stages for manufacturing the box shown in FIG. 10a.

FIGS. 37a and b illustrate an example of change of the plate length during the bending process.

FIGS. 38a to 38z illustrate bending steps for manufacturing the box shown in FIG. 10b.

DETAILED DESCRIPTION OF THE PREFERRED EMBODIMENTS

Figure 1:
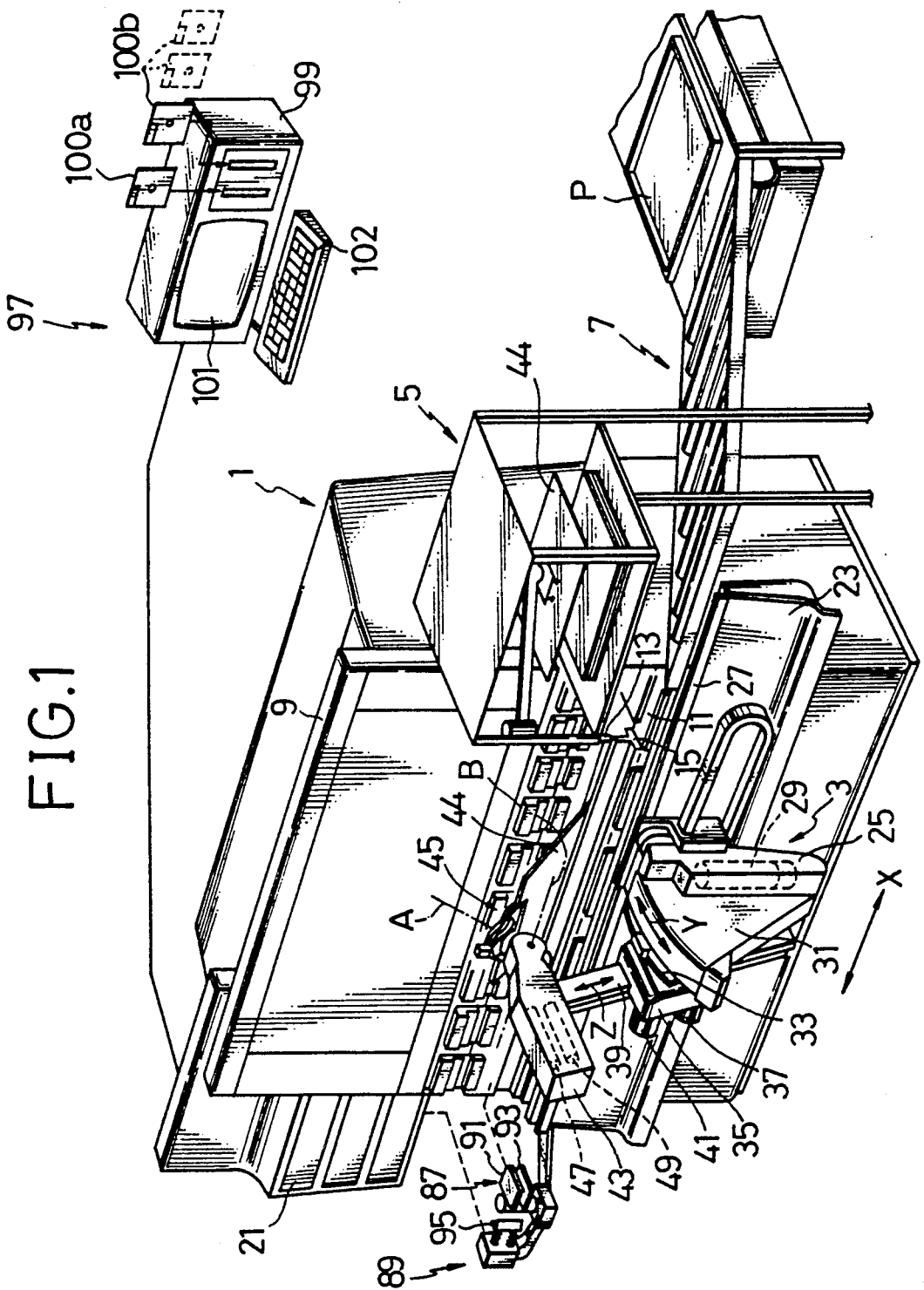
FIG. 1 is a perspective view of a plate bending device including a control device for controlling a manipulator for a plate bending machine, according to an embodiment of the present invention.

Now referring to FIG. 1, a manipulator 3 is mounted on the front side of a plate bending machine 1 which may be, for example, a press break or the like. A magazine 5, in which a plate workpiece 44 is housed, is provided on the side of the plate bending machine 1. In addition, a transport device 7 for transporting a product P after bending to the next process is provided. The magazine 5 and the transport device 7 may be of a structure commonly used for such devices, therefor a detailed explanation is omitted.

The plate bending machine 1, in the same manner as the usual type of press break, is provided with an upper frame 9 and a lower frame 11. An upper die 13 is mounted in a freely removable manner on the upper frame 9. In addition, a lower die 15 mounted on the lower frame 11.

As is commonly known, in the plate bending machine 1 with this type of configuration, one of the upper frame 9 and lower frame 11 can be elevated, and the bending operation of the workpiece 44 is carried out by the interposition of the workpiece 44 between the upper die 13 and the lower die 15 and by the subsequent engagement of the upper die 13 and the lower die 15.

Further, details have been omitted from the drawings, but, the configuration of this embodiment of the present invention is such that the lower frame 11 is elevated.

In addition, on the plate bending machine 1, a back gauge 17 which positions the workpiece 44 in the front-to-back direction (in FIG. 2, the left-to-right direction: the Y axis direction) is provided with free positional movement in the front-to-back direction. A plurality of sensors 19 are mounted in various positions on the back gauge 17 to detect contact with the workpiece 44. The sensors 19 are linear transducers with a comparatively long measurement stroke, similar, for example, to a direct acting potentiometer.

As a result of the above configuration, when the workpiece 44 is positioned by contact with the back gauge 17 previously positioned by a usual means, a determination is made as to whether or not the outputs of the sensors 19 in a plurality of positions match the prescribed output values. By this means it is known whether or not the edge of the workpiece 44 is parallel to the bending line of the upper and lower dies 13, 15 (hereinafter referred to as the bending axis C). Accordingly, it can be determined whether or not the workpiece 44 is in the correct position.

The output from the sensor 19 is input to a conventional numerical control device 21 mounted on the upper frame 9. The numerical control device 21 controls the operation of each working section of the plate bending machine 1 and the operation of the back gauge 17, as well as the operation of the manipulator 3. The output signals from the sensors 19 are input to the numerical control device 21 so that the operation of the manipulator 3 is controlled, and the output values of the sensors 19 reach the desired output values. In the present invention, the manipulator 3 is mounted on a base plate 23 which is integrally installed on the freely elevatable lower frame 11.

More specifically, the base plate 23 extends in the lateral direction (X-axis direction) along the longitudinal direction of the lower die 15. A first transfer block 25 is supported in a freely movable manner along the X-axis on the front surface of the base plate 23. A pinion (omitted from the drawings) which engages a rack rod 27 in the X-axis direction mounted on the base plate 23 is mounted in a freely rotatable manner on the first transfer block 25. A first servo motor 29 is provided for rotatably driving the pinion. The power transmission system by which the first servo motor 29 drives the pinion may be any normal configuration. A detailed explanation is therefore omitted. The first servo motor 29 may be, for example, a stepping motor or the like, and is provided with a position sensing device such as an encoder.

As a result of the above configuration, the first transfer block 25 can be moved in the X-axis direction by the operation of the first servo motor 29, and the position of the first transfer block 25 when moving in the X-axis direction can be detected by the position sensing device.

Figure 2:
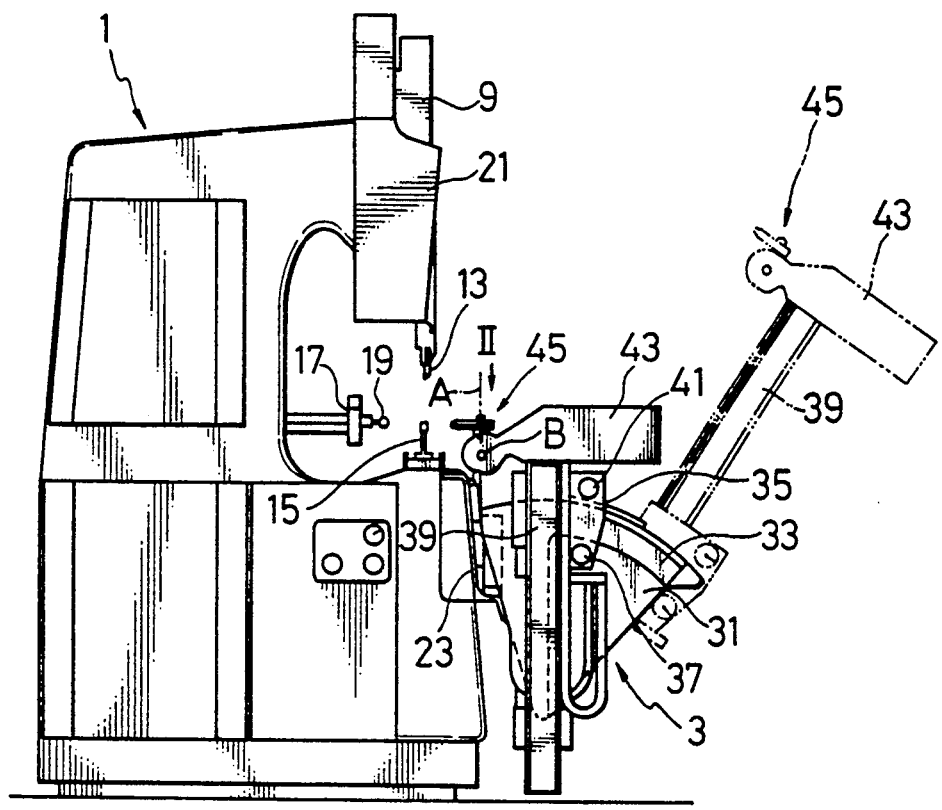
FIG. 2 is a side elevational view of the plate bending machine including the manipulator.

As is clearly shown in FIG. 1 and FIG. 2, a fan-shaped section 31 is provided, extending in the longitudinal direction (Y-axis direction) of the top section on the first transfer block 25. An arc-shaped rack member 33 is provided on the top of the fan-shaped section 31. A second transfer block 35 which is freely movable in the Y-axis direction along the rack member 33 is supported on the rack member 33. A pinion (omitted from the drawings) which engages the rack member 33 is provided in a freely rotatable manner, and a second servo motor 37 which rotatingly drives this pinion is installed on the second transfer block 35. The second servo motor 37 is provided with a position sensing device such as an encoder in the same way as with the first servo motor 29.

As a result of the above configuration, the second transfer block 35 is moved in the Y-axis direction in an arc along the rack member 33 driven by the second servo motor 37. The position of the second transfer block 35 in the Y-axis direction is detected by means of the position sensing device provided on the second servo motor 37.

As is clearly shown in FIG. 1 and FIG. 2, an elevating brace 39 which is freely movable in the vertical Z-axis direction is supported on the second transfer block 35, perpendicular to the direction of movement of the second transfer block 35. A rack is formed on in the vertical direction on the elevating brace 39. The pinion (omitted from the drawings) which engages this rack is supported in a freely rotatable manner on the second transfer block 35, and a third servo motor 41 is mounted on the second transfer block 35 in a manner to rotatably drive this pinion. The third servo motor 41 is provided with a position sensing device in the same way as with the second servo motor 29.

As a result of the above configuration, the elevating brace 39 is activated vertically, driven by the third servo motor 41, and the vertical position of the elevating brace 39 is known from being detected by the position sensing device.

An arm 43 extending in the Y-axis direction is suitably secured to the upper part of the elevating brace 39. A plate clamping device 45 is mounted on the tip of the arm 43 in a manner to freely grasp one side edge section of the workpiece 44. More specifically, as shown in FIG. 1 and FIG. 2, the plate clamping device 45 is provided in a manner to freely rotate in the vertical direction around a shaft B which is parallel to the X-axis. The plate clamping device 45 is also capable of freely rotating around a axis A which is perpendicular to the axis B.

A fourth servo motor 47 for rotating the plate clamping device 45 around the axis A, and a fifth servo motor 49 for rotating the plate clamping device 45 vertically around the axis B, are mounted on the arm 43. The fourth and fifth servo motors 47, 49 are each provided with a position sensing device in the same way as with the first servo motor 29. In addition, various types of mechanisms can be adopted as a power transmission mechanism for rotating the plate clamping device 45 around the axis A by means of the fourth servo motor 47, and as a power transmission mechanism for rotating the plate clamping device vertically by means of the fifth servo motor 49. Because these mechanisms have no special features a detailed description is omitted.

Figure 3:
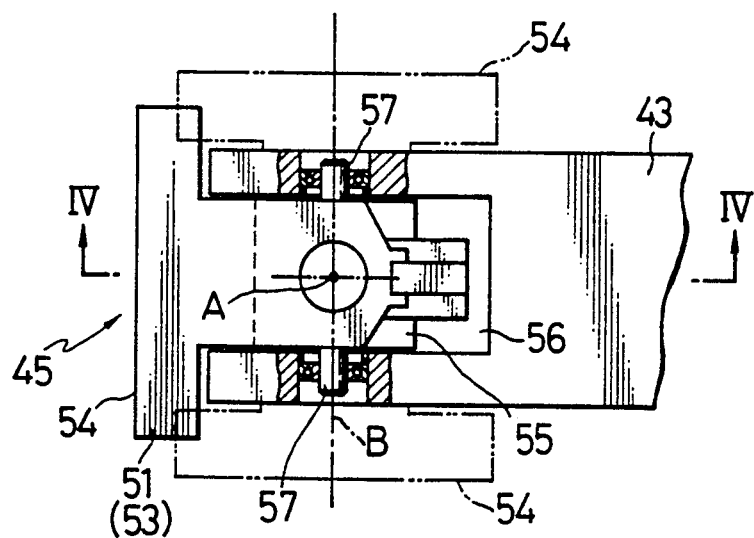
FIG. 3 is a fragmentary plan view of a plate clamping device mounted on the manipulator.
Figure 4:
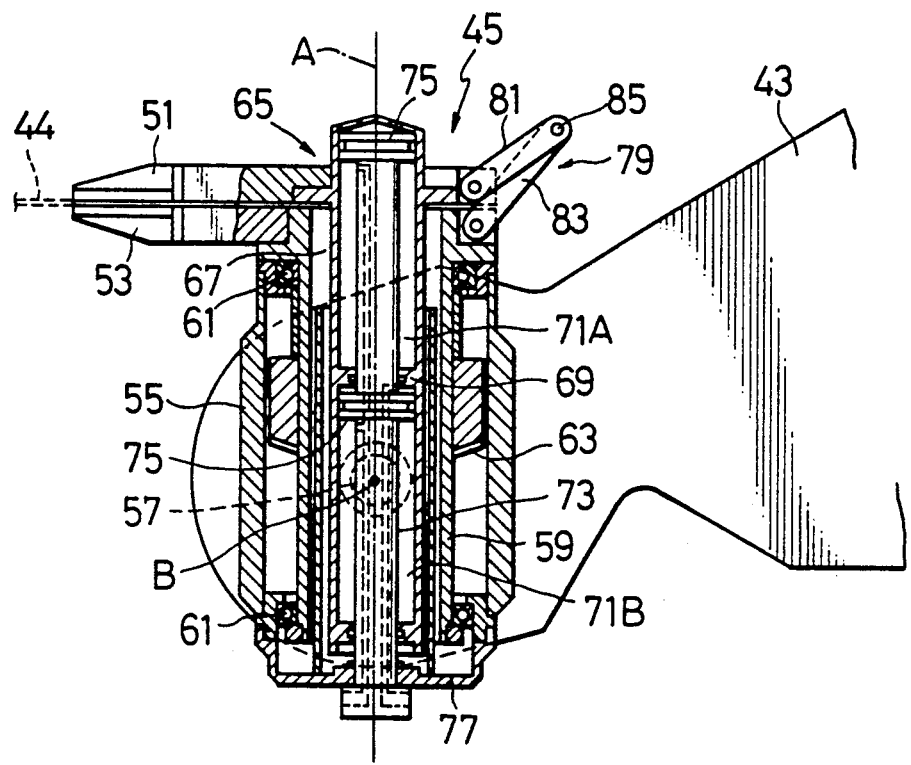
FIG. 4 is a cross-sectional view taken at the line IV—IV in FIG. 3.

As indicated in more detail in FIG. 3 and FIG. 4, the plate clamping device 45 is provided with an upper jaw 51 and a lower jaw 53 for grasping the workpiece 44. The upper jaw 51 and the lower jaw 53 are formed with a wide width plate clamping section 54 which clamps the workpiece 44, to have an almost T-shape. The jaws 51, 53 are supported in a freely reversing manner on a freely rotating sleeve 55 which rotates around the shaft B.

More specifically, the rotating sleeve 55, as clearly shown in FIG. 3, is positioned in a crevice-shaped concave section 56 formed at the tip of the arm 43. A pair of stub shafts 57 are provided, one on each side of the rotating sleeve 55 on the same centerline as the shaft B. Specifically, the rotating sleeve 55 is supported in a freely rotating manner on the tip of the arm 43 through the medium of the pair of stub shafts 57. Further, a chain sprocket or the like (omitted from the drawings) is provided on one of the pair of stub shafts 57. The chain sprocket receives motive power from the fifth servo motor 49.

As is shown in detail in FIG. 4, a tube 59 rotating in a direction at right angles to the shaft B is supported in a freely rotating manner through the medium of a plurality of bearings 61 on the inside of the rotating sleeve 55. The centerline of the rotating tube 59 coinsides with the axis A. The lower jaw 53 is integrally mounted on the upper end of the rotating tube 59. A bevel gear 63 which receives motive power from the fourth servo motor 47 is integrally mounted on the rotating tube 59.

A linear motion type actuator 65 such as, for example, a cylinder actuator or the like is provided in the interior of the rotating tube 59. More specifically, a cylinder 67 is provided with free vertical activation. The upper jaw 51 is integrally mounted on the top of the cylinder 67. A vertical two-stage pressure chamber comprising a chamber 71A and a chamber 71B is formed by a dividing wall 69 inside the cylinder 67. The chambers 71A, 71B are engaged by a plurality of pistons 75 mounted on a piston rod 73 and are connected by a fluid channel formed in the piston rod 73. The lower part of the piston rod 73 is integrally mounted on a rod holder 77 which in turn is integrally mounted on the rotating sleeve 55.

In order to control the relative rotary motion of the upper jaw 51 and the lower jaw 53, the upper jaw 51 and the lower jaw 53 are mutually linked through the medium of a link mechanism 79. Specifically, as is clearly shown in FIG. 4, the end of a first link 81 of which the base is pivotally supported on the upper jaw 51, and the end of a second link 83 of which the base is pivotally supported on the lower jaw 51, are linked in a pivotally supported manner through a pin 85.

As a result of the above configuration, the upper jaw 51 can move up and down through the action of the actuator 65 and the workpiece 44 can be clamped between the upper jaw 51 and the lower jaw 53. Because the actuator 65 is provided with the upper and lower pressure chambers 71A, 71B, a comparatively large clamping force can be obtained even with a short stroke.

The upper and lower jaws 51, 53 can be rotated around the shaft A, driven by the fourth servo motor 47. As shown in FIG. 3, the plate clamping section 54 can be positioned in the longitudinal direction of the arm 43 as well as being positioned projectingly in the direction of both sides. Accordingly, when the plate clamping section 54 is in the state where it projects to the sides of the arm 43, the upper and lower surface of the workpiece 44 which is clamped in the plate clamping section 54 are reversed by the rotation of the rotating sleeve 55 around the shaft B.

Moreover, in the bending state on the workpiece 44 being bent by the upper and lower dies 13, 15, the plate end section clamped by the manipulator 3 can, for example, move upward with the plate clamping device 45 following this movement. Specifically, during processing, corresponding to the movement of the workpiece 44, the elevating brace 39 is elevated and the plate clamping device 45 is rotated downward around the shaft B.

Again referring to FIG. 1, an auxiliary clamping device 87 which freely grasps the workpiece 44 temporarily is mounted on one side section of the base plate 23 or the lower frame 11, and a side gauge device 89 is suitably mounted through the medium of a bracket.

An upper jaw 91 and a lower jaw 93 are provided on the auxiliary clamping device 87 to grasp the workpiece 44. The vertical movement of the upper jaw 91 is carried out in the same way as with the actuator 65 in the plate clamping device 15, by means of an actuator (omitted from the drawings). Accordingly, a detailed description of the action of the upper jaw 91 is omitted.

The side gauge device 89 is provided with a side sensor 95 and is used to detect the positional relationship of one side of the workpiece 44 which is clamped by the manipulator 3 and the plate clamping device 45. The side sensor 95, comprises a linear transducer such as a direct acting potentiometer, in the same way as the sensor 9 provided on the back gauge 17. The output value of the side sensor 95 is input to the numerical control device 21.

Accordingly, when one side edge of the workpiece 44 clamped in the plate clamping device 45 contacts the side sensor 95, and when the output value of the side sensor 95 is the stipulated output value, the position of the manipulator 3 in the direction of the X-axis is read by the numerical control device 21 from the detected value of the position detector device provided on the first servo motor 29. By comparing the detected value with the position output value of the base position when the workpiece 44 is not being clamped, the positional relationship in the X-axis direction of the side edge of the workpiece 44 clamped in the workpiece clamping device 45 and the manipulator 3 can be determined. Accordingly, with the side gauge device 89 as the base, the positioning of the X-axis direction of the workpiece 44 with respect to the upper and lower dies 13, 15 can be accurately performed.

Figure 5:
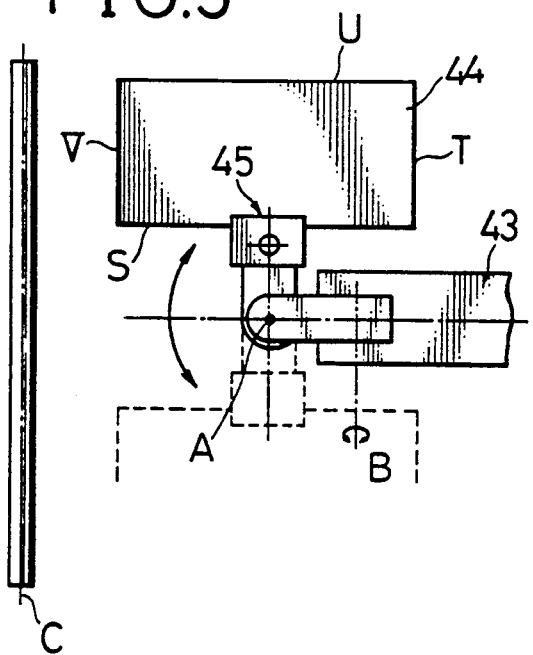
FIG. 5-FIG. 9 illustrate operation of the plate clamping device.

As a result of the above configuration, as shown in FIG. 5, when the plate clamping device 45 is clamping the side S of a rectangular workpiece 44, the other three sides, T, U, V can be positioned with respect to the bending axis C by rotating the plate clamping device 45 around the axis A. Accordingly, it can be understood that the bending process on the three sides T, U, V can be performed consecutively. In addition, as shown in FIG. 5, when the plate clamping device 45 projects to the side of the arm 43, the workpiece 44 can be reversed in the vertical direction by rotation around the shaft B. Specifically, even the reverse bending of the workpiece 44 can be performed in sequence.

Figure 6:
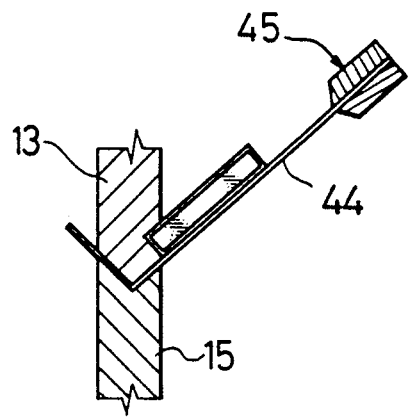
Figure 8:
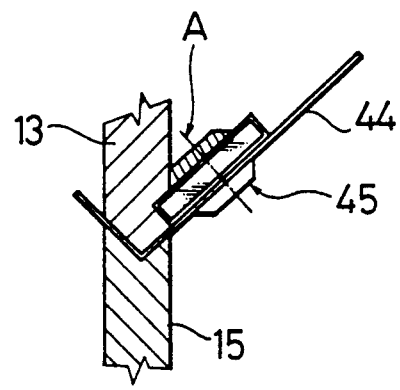
Figure 7:
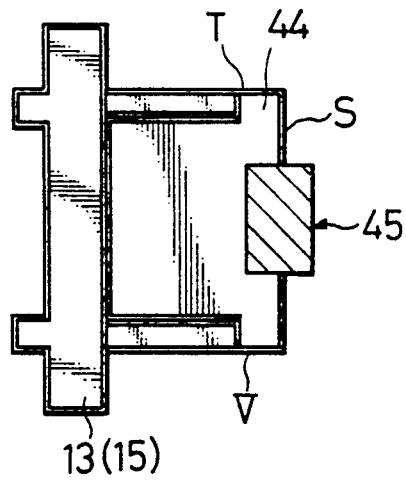
Figure 9:
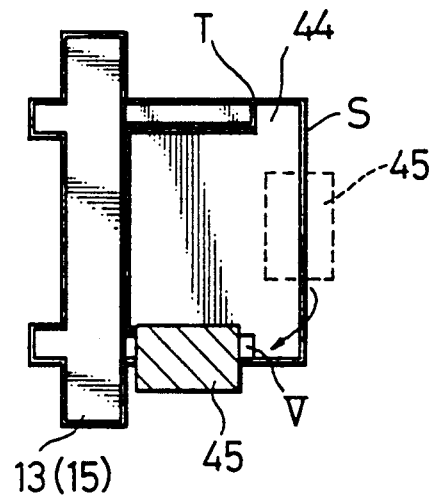

As outlined above, after the three sides T, U, V of the workpiece 44 have been bent, to bend the side S, as shown in FIG. 6 and FIG. 7, with the side U of the workpiece 44 interposed between the upper and lower dies 13, 15, as shown in FIG. 8 and FIG. 9, the workpiece clamping device 45 is moved to the T side or the V side, and the clamping of the workpiece 44 is improved. Then, by positioning the S side of the workpiece 44 on the bending shaft C, the bending of the side S can easily be carried out.

Furthermore, in the difficult case of improving the clamping when the workpiece 44 is interposed between the upper and lower dies 13, 15 and the dimensions of the workpiece 44 are comparatively small, the workpiece is moved to the position of the auxiliary clamping device 87, and the clamping of the workpiece 44 can be easily improved by temporarily clamping the workpiece 44 with the auxiliary clamping device.

Again referring to FIG. 1, a control device 97, such as a computer, for controlling the plate bending machine 1 and the manipulator 3 and the like through the numerical control device 21 is provided. The control device 97 comprises a central processing unit (CPU) 99, a display device 101, and a keyboard 102.

Also, the control device 97 is so constructed as to be capable of receiving data from storage mediums 100a, 100b, such as floppy disks, for controlling the CPU 99. The storage mediums comprise a system instruction storage medium 100a for storing instructions for the basic system of the control device 97, and a bending parameter storage medium 100b for storing bending parameters corresponding to a specific shape of a product. Here, the bending parameter storage medium 100b is prepared for each shape of product (however, parameters corresponding to the dimensions of the products is stored as free parameters). Therefore, the storage mediums are prepared as much as the number of desired shape of the products.

Figure 10A:
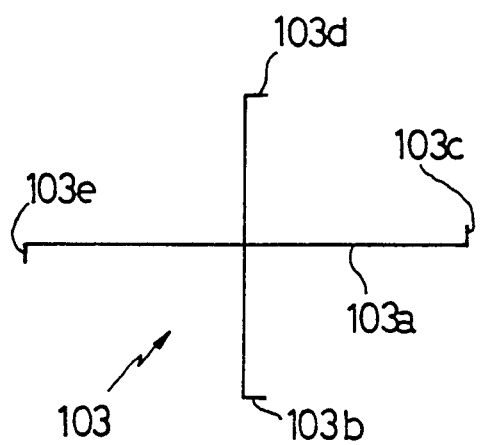
FIG. 10a, FIG. 10b and FIG. 10C illustrate examples of boxes manufactured by the plate bending device.
Figure 10B:
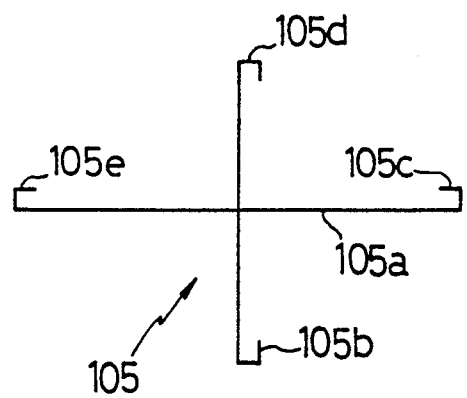
Figure 10C:
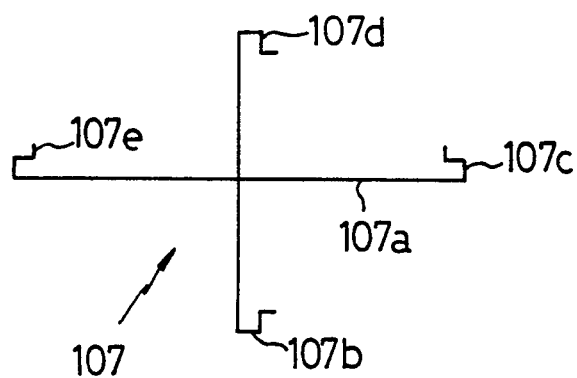

Now, for convenience in the following explanation, a plurality of boxes 103, 105, 107 which are examples of boxes manufactured under the control of the control device 97 are shown in FIGS. 10a, 10b, and 10c (in FIGS. 10a, 10b, and 10c, the boxes 103, 105, 107, are shown as longitudinal and lateral sectional drawings). Specifically, the box 103 shown in FIG. 10a comprises a plurality of flanges 103b, 103c, and 103d, formed by bending 180 deg upward with respect to a bottom 103a, and a flange 103e formed by bending 90 deg downward. The box 105 shown in FIG. 10b comprises a plurality of flanges 105b, 105c, 105d, and 105e formed by bending in two stages, 90 deg upward and 90 deg inward with respect to a bottom 105a. The box 107 shown in FIG. 10c comprises a plurality of flanges 107b, 107c, 107d, and 107e formed by bending in two stages, 90 deg upward and 90 deg inward with respect to a bottom 107a, followed by a further upward bend of 90 deg.

Figure 11:
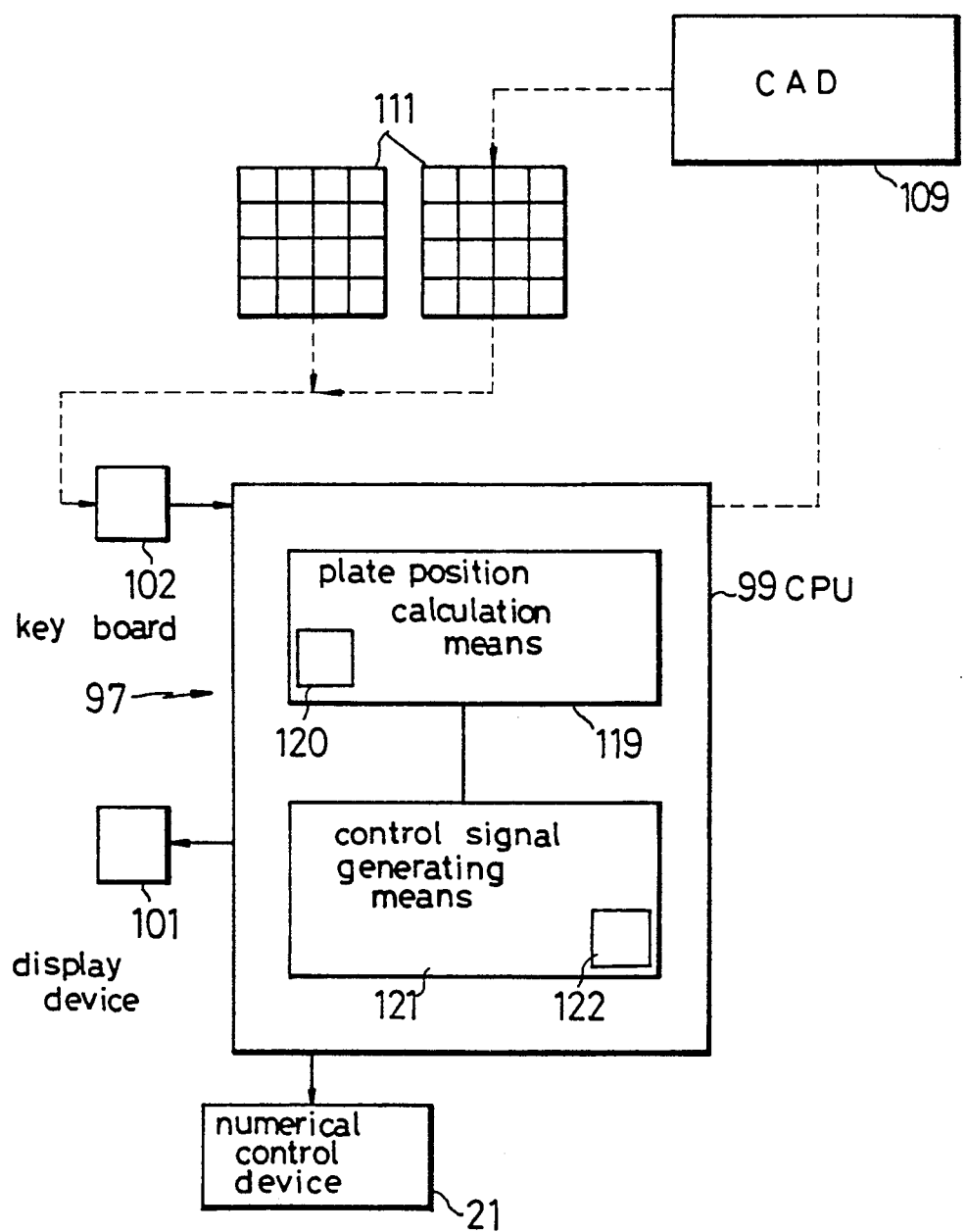
FIG. 11 is a block diagram of the control device.
Figure 12:
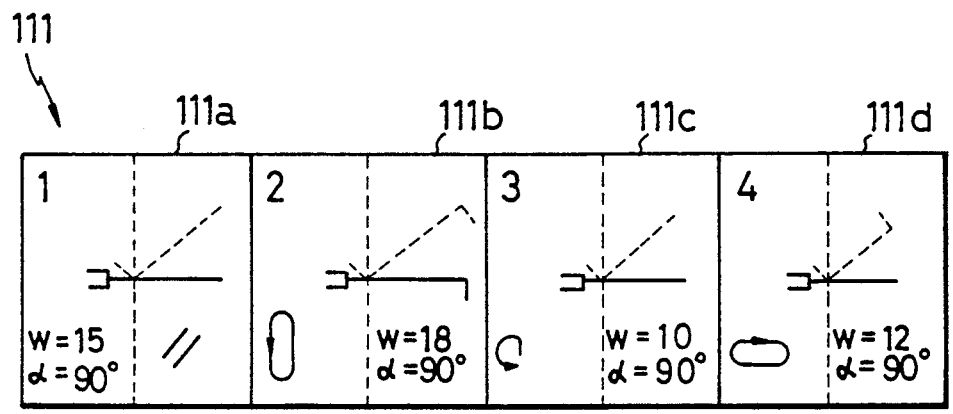
FIG. 12 is a bending stage diagram showning bending stages of bending operation performed by the plate bending device.
Figure 13:
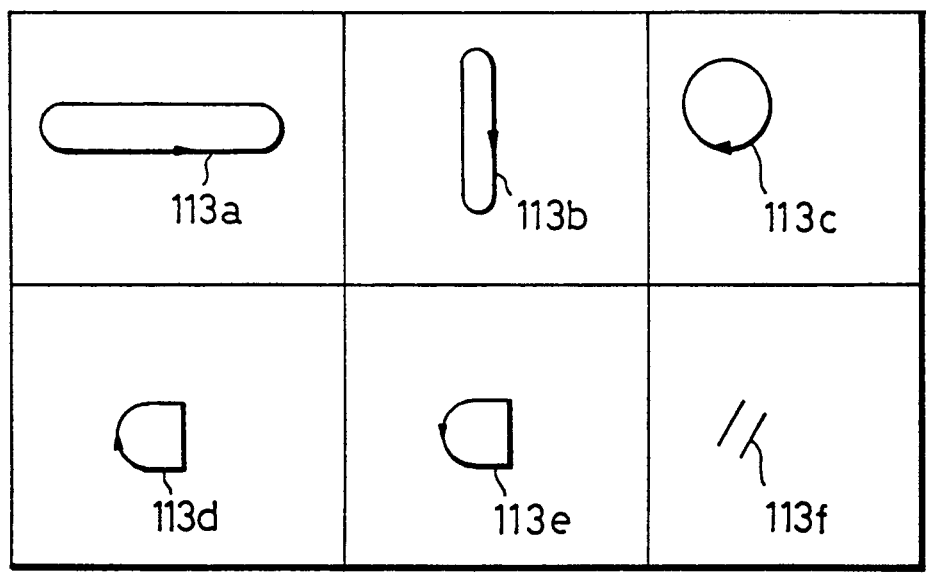
FIG. 13 illustrates the symbol used in the bending stage diagram.

Next, referring to FIG. 11 to FIG. 13, a detailed explanation is given of the configuration of the computer 97 as the control device of the present embodiment, and its peripheral devices.

First, as peripheral equipment for the computer 97, a system 109 (CAD) utilizing the computer is provided.

The CAD system 109, for example, is used to create a bending process diagram 111 for manufacturing a product such as the box shown in FIG. 10. This process diagram 111, in the case where the box 103 of FIG. 10a is being manufactured, comprises four types of bending stage diagrams such as shown in FIG. 12.

As shown in FIG. 12, these bending stage diagrams are shown as longitudinal (along Y-axis) sectional drawings of the plate 44 and contain solid lines showing the plate shape before each bending stage as well as dotted lines showing the plate shape after each bending stage. In these bending stage diagrams, the height W of the bending flanges for each bending stage, and the bending angle (alpha), are also provided. Also, the plate movement when shifting from a certain bending stage to another bending stage is shown as the arrow symbols. FIG. 13 shows all of the arrow symbols 113a to 113f which is used in the bending process diagram 111. Here, the arrow symbol 113a indicates an operation by which the plate is rotated 180 deg in a horizontal plane; the arrow symbol 113b indicates an operation in which the sides of the plate are reversed; the arrow symbol 113c indicates an operation in which the plate is rotated and reversed simultaneously; the arrow symbol 113d indicates an operation in which the plate is rotated 90 deg clockwise in a horizontal plane; the arrow symbol 113e indicates an operation in which the plate is rotated 90 deg counterclockwise in a horizontal plane; the symbol 113f indicates an operation in which neither a rotation nor reversal is performed.

Accordingly, in FIG. 12, in the first bending stage 111a, prior to the bending of the first flange, the plate is neither rotated nor reversed (113f); in the second bending stage 111b, prior to the bending of the second flange, the sides of the plate are reversed (113b); in the third bending stage 111c prior to the bending of the third flange, the plate is rotated 90 deg counterclockwise (113e); in the fourth bending stage 111d, prior to the bending of the fourth flange, the plate is rotated 180 deg (113a).

Figure 14A:
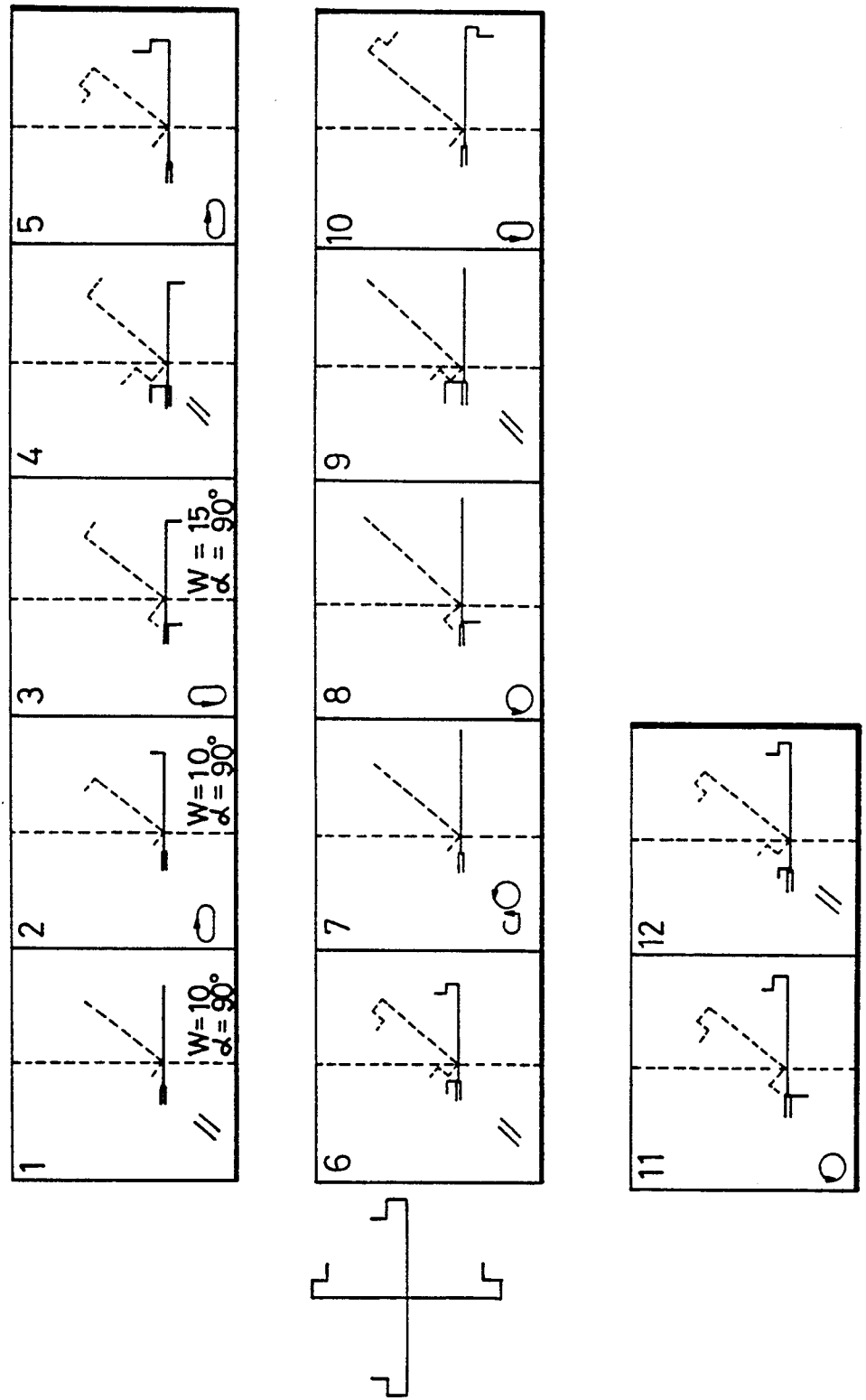
Figure 15:
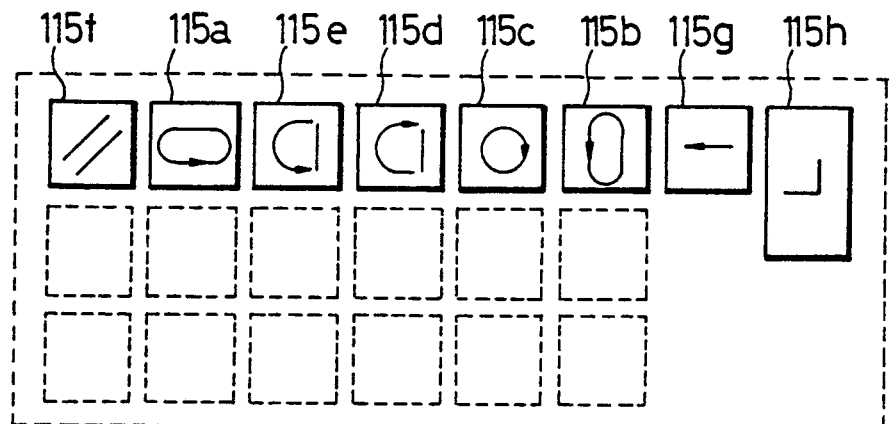
FIG. 15 illustrates a keyboard mounted on the control device.

In this way, in the case where the box 107 shown in FIG. 10c is being manufactured, the process diagrams such as shown in FIGS. 14a and 14b are drawn up by the CAD system 109.

Further, it is not always necessary to draw up these process diagrams by CAD. For example, they may be obtained from a design company.

In addition, the CAD system 109, in addition to preparing process diagrams, is also used to communicate with the control device 97 and supplement its action.

Once again referring to FIG. 11, the keyboard 102 is provided as an input means for the computer 97 for inputting the process diagrams and the like thereinto.

Figure 16:
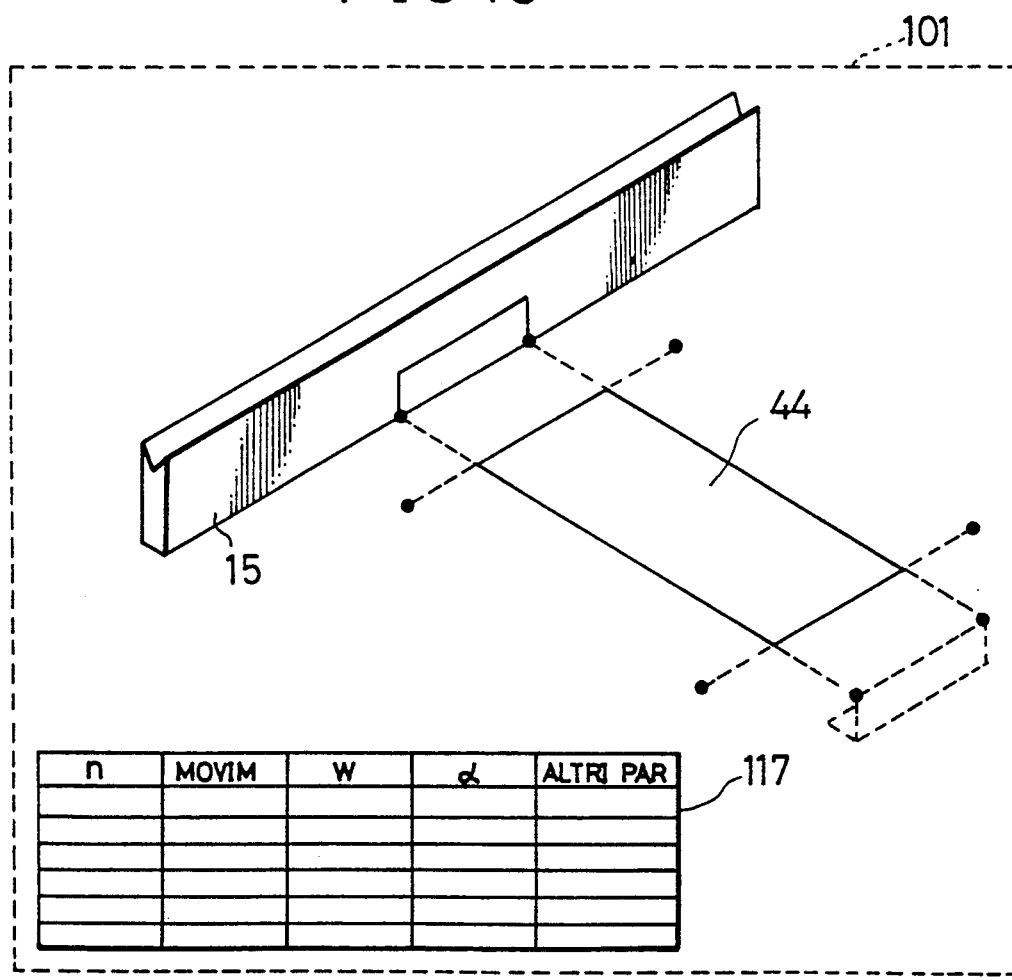
FIG. 16 illustrates a picture displayed on a display device mounted on the control device.

On the keyboard 102 a plurality of keys 115a to 115f are provided corresponding to the rotating and reversing operations 113a to 113f performed on the plate. A key 115g is also provided to erase the input data entered from the keys 115a to 115f. A key 115h is provided for displaying, on the display means 101, a table 117 showing the bending stages and a perspective drawing of the workpiece 44, based on the input data entered from the keys on the keyboard 102 including the keys 115a to 115f as shown in FIG. 16; after the key 115h is depressed, when a plate transfer parameter and a bending parameter are input (for example, flange height, bending angle, and the like), the parameters are displayed for each bending stage in turn and, based on the data the bending shape of the plate is displayed on the display means, such as shown in FIG. 16. Accordingly, the desired bending shape of the product is finally displayed on the display means 101.

Now again referring to FIG. 11, the CPU 99 is provided in the control device 97 of the present invention. A plate position calculation means 119 and a control signal generating means 121 are provided in the CPU 99. The plate position calculation means 119, based on the amount of plate rotation and the presence or absence of plate reversing in each bending stage, and the position of the plate in the initial bending stage, successively calculates the plate position in the second and subsequent bending stages. As shown in FIG. 11, in the plate position calculation means 119, a initial position supplying means 120 is provided for the supply of the position of the plate in the initial bending stage.

In addition, the drive control signal generating means 121 generates a drive control signal for the manipulator 3, based on the plate position in the bending stages and parameters relating to (1) the plate, (2) the bending machine and (3) the manipulator, such as dimension of the plate, dimension of the members of the bending machine and that of the manipulator. As shown in FIG. 11, in the control signal generating means 121, a standard transfer program storage means 122 is provided for storing standard transfer program for the manipulator 3, under which the manipulator 3 will be transferred between prescribed characteristic positions.

The numerical control device 21 in the CPU 99 is connected to the manipulator 3.

Accordingly, as a result of the above configuration, when the stipulated parameters based on the process diagram are entered form the keyboard, the parameter is displayed on the display device 101 together with the perspective drawing of the workpiece in each bending stage, the plate is rotated and reversed according to the process diagram, and the drive of the manipulator 3 is controlled.

Next, based on FIG. 17 to FIG. 37, the drive control process for the manipulator 3 using the control device 97 will be explained.

Figure 17:
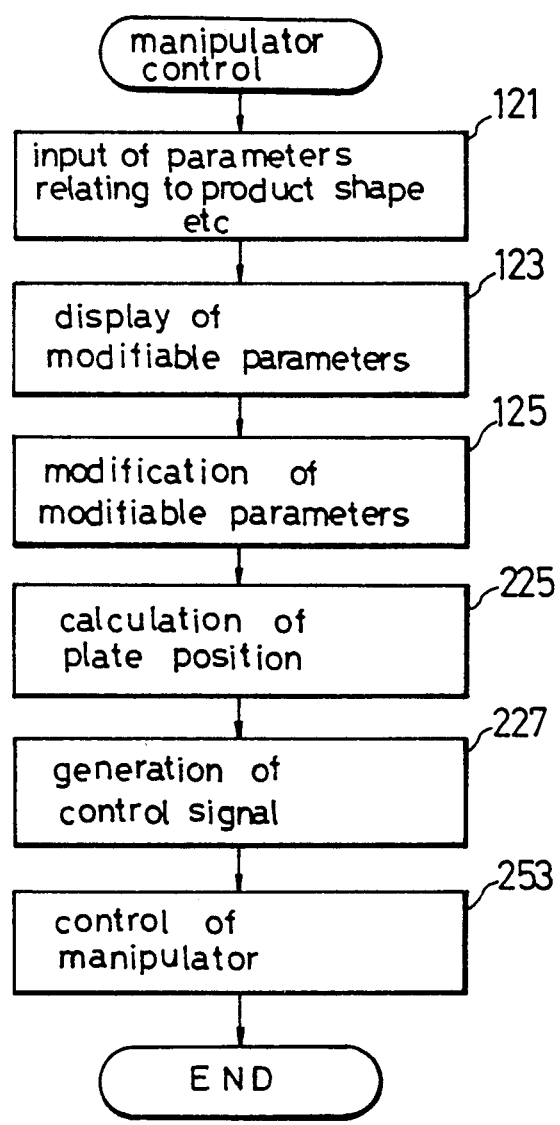
FIG. 17 is a flow chart showing a control method of the manipulator according to an embodiment of the present invention.

FIG. 17 is a flow chart showing the main control process. In a step 121, parameters corresponding to the bending process (such as length of the plate, width of the plate, type of movement of the plate in each bending step shown by the symbols 113a to 11f, bending flange height, bending angle, and the like) are entered from the keyboard 115, based on previously prepared bending process diagrams. As previously outlined, after the key 115h is depressed, each time a parameter is entered, the input data and the plate shape after the bending process according to the input data are displayed on the display device 101.

Next, in step 123, from among the parameters essential for the bending process, a list of the parameters which the operator can modify if necessary is displayed on the display device 101.

Included in these parameters, other than the parameters input in the step 121, are dimensions of the die 15 and the jaw 51 for the plate clamping device, as well as parameters displaying the relation between the die 15, the workpiece 44, the jaw 51 for the plate clamping device, and the like. For clear understanding, these parameters are shown in FIG. 18 to FIG. 31.

Figure 18:
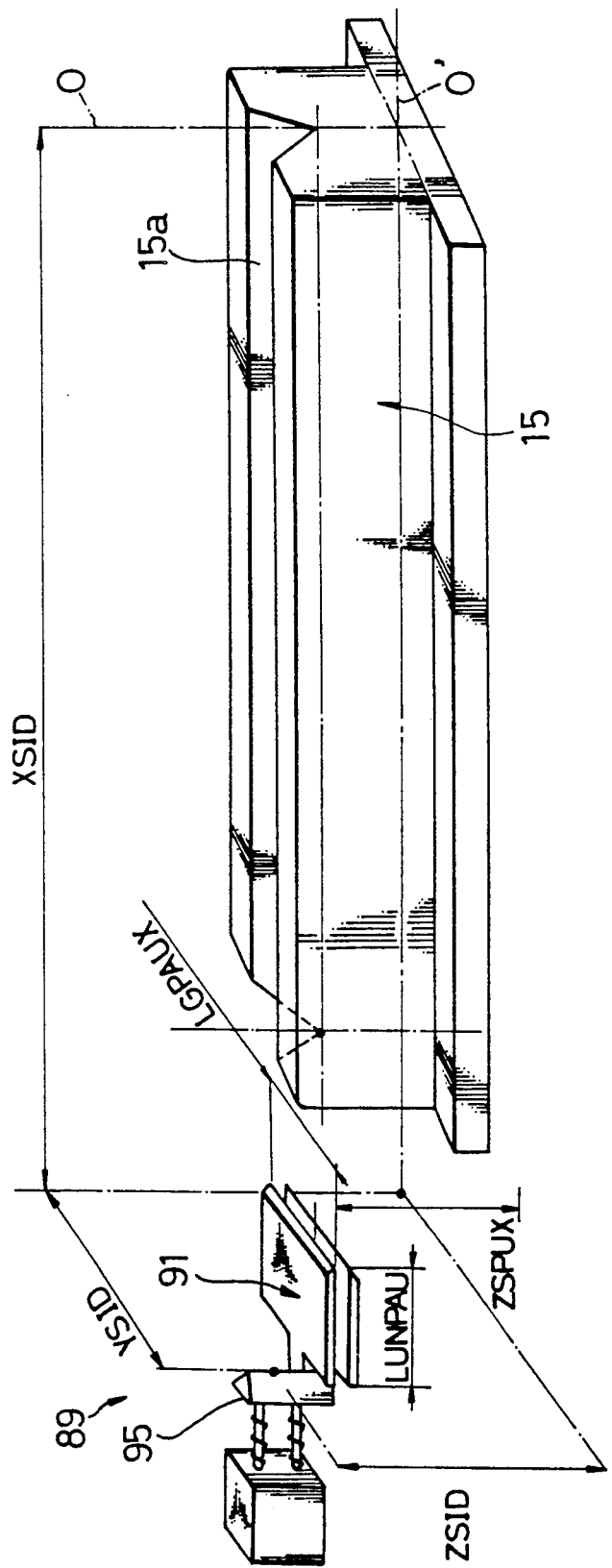
FIG. 18–FIG. 31 illustrate various parameters used in the control method.

In FIG. 18, parameters relating to the die 15, the auxiliary clamping device 87, and the side gauge device 89 are shown. In this drawing, symbol "0" represents a first reference axis passing through the right bottom edge of a bending channel 15a formed in the die 15, while symbol "0'" represents a second reference axis passing through a point a stipulated distance below the channel 5a, running parallel thereto. Here, XSID: the distance between the first reference axis 0 and the forward tip of the sensor 95 of the side gauge device 89, measured along the X-axis.

YSID: the distance between the first reference axis 0 and the forward tip of the sensor 95 of the side gauge device 89, measured along the Y-axis.

ZSID: the distance between a point 40 mm below the upper edge of the sensor 95 and the second basic axis 0', measured along the Z-axis.

LUNPAU: the length of the jaws 91, 93.

LGPAUX: the width of the jaws 91, 93.

ZSPUX: the distance between the upper jaw 91 in the closed state and the second reference axis 0' measured along the Z-axis.

Figure 19:
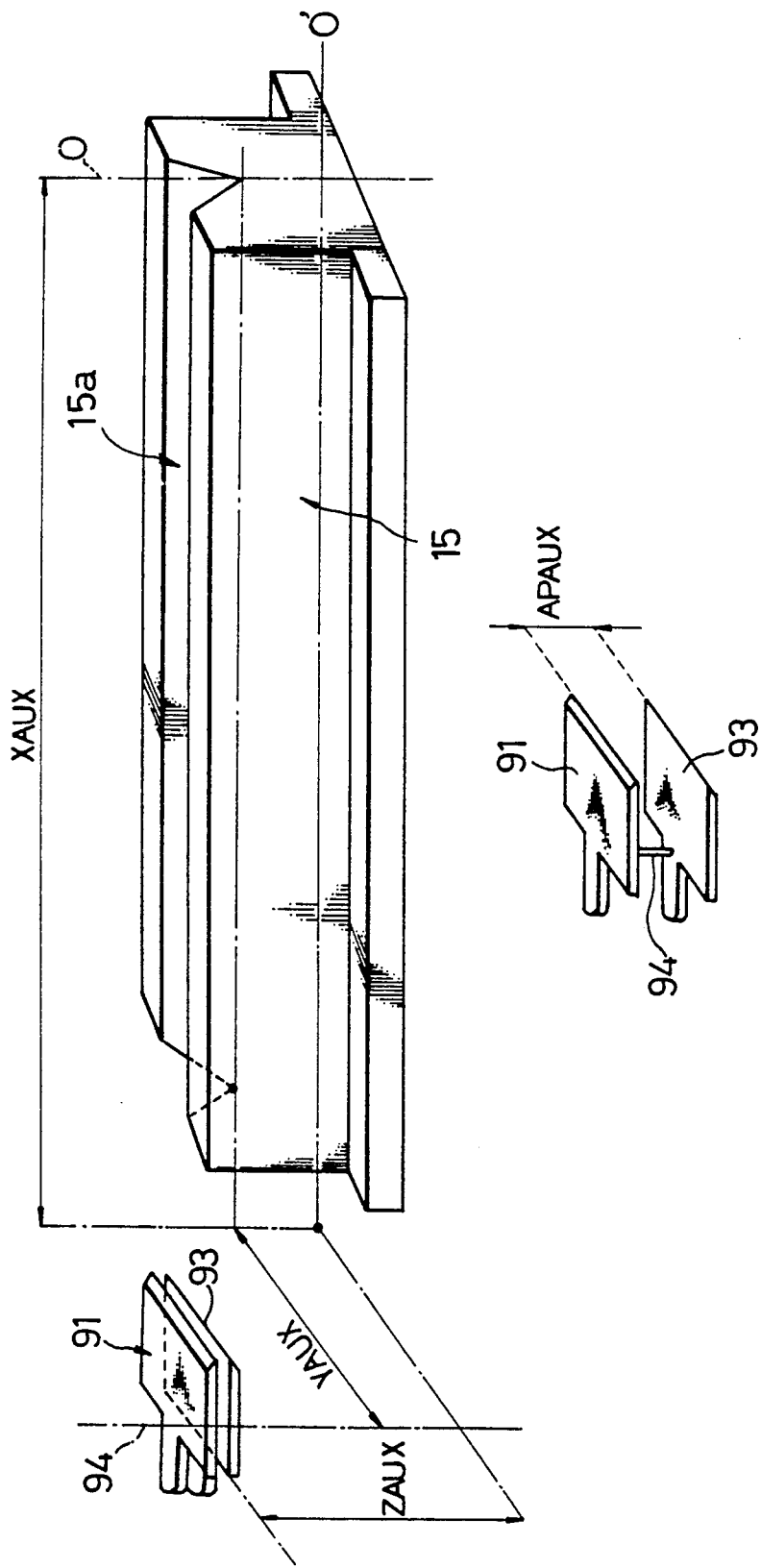

In FIG. 19, parameters relating to the die 15 and the jaws 91, 93 of the auxiliary clamping device 87 are shown. In addition, in FIG. 19 a supporting shaft 94 for freely supporting the jaws 91, 93 in the vertical direction is shown:

XAUX: the distance between the first reference axis 0 and the supporting shaft 94, measured along the X-axis.

YAUX: the distance beween the first reference axis 0 and the supporting shaft 94, measured along the Y-axis.

ZAUX: the distance between the second reference axis 0' and the lower jaw 93, measured along the Z-axis.

APAUX: the maximum open width of the jaws 91, 93.

Figure 20:
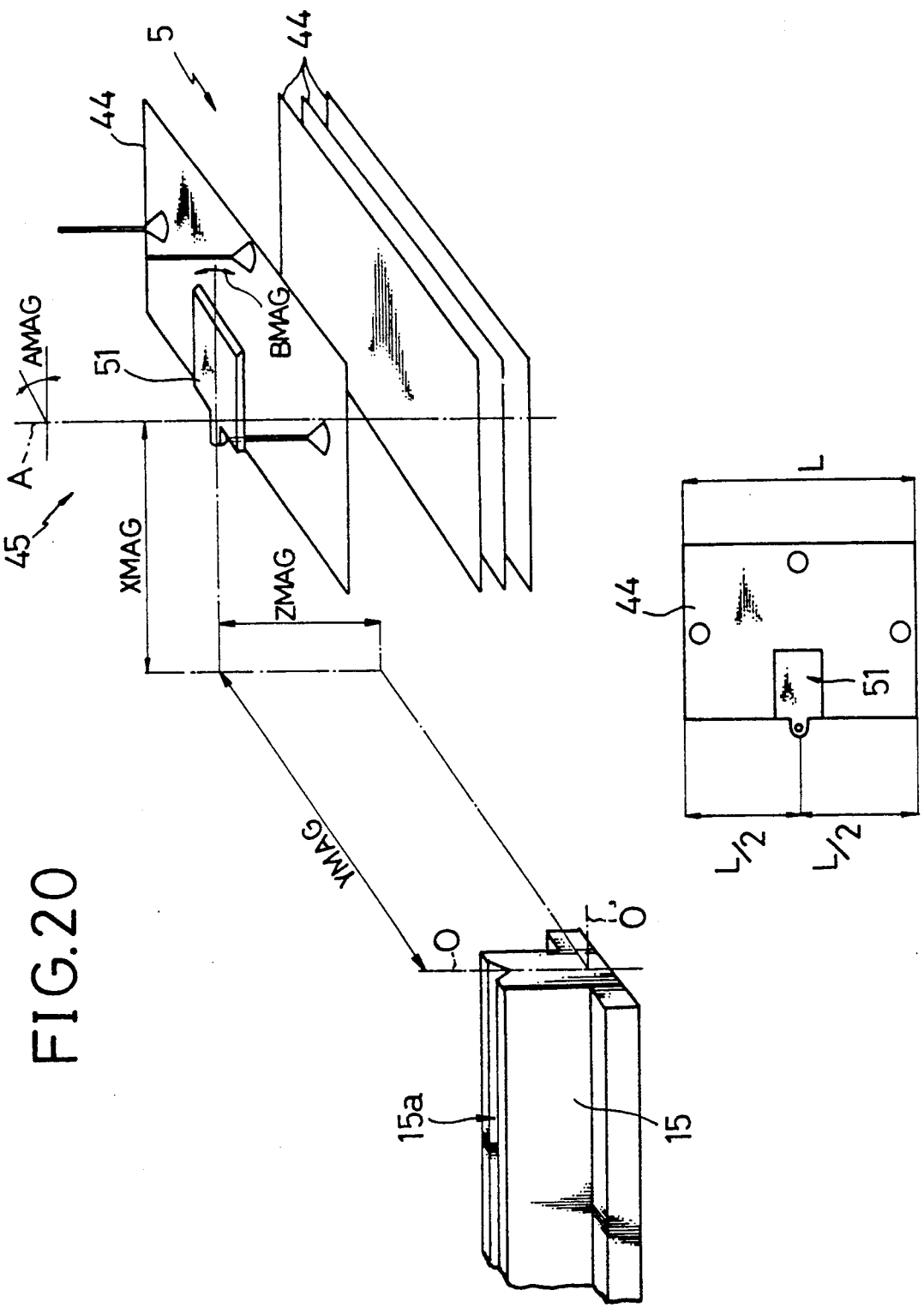

In FIG. 20, parameters relating to the die 15 and the clamping device 45 in the state where the plate is removed from the magazine 5 are shown:

XMAG, YMAG: the distance between the axis A of the plate clamping device 45 in the state where the plate is removed from the magazine 5 and the first reference axis 0, measured along the X-axis and the Y-axis respectively.

ZMAG: the distance between the second reference axis 0' and the upper jaw 51 in the previously mentioned stage, measured along the Z-axis.

AMAG, BMAG: the angle of rotation of the jaws 51, 53 around the A-axis and the B-axis respectively.

Figure 21:
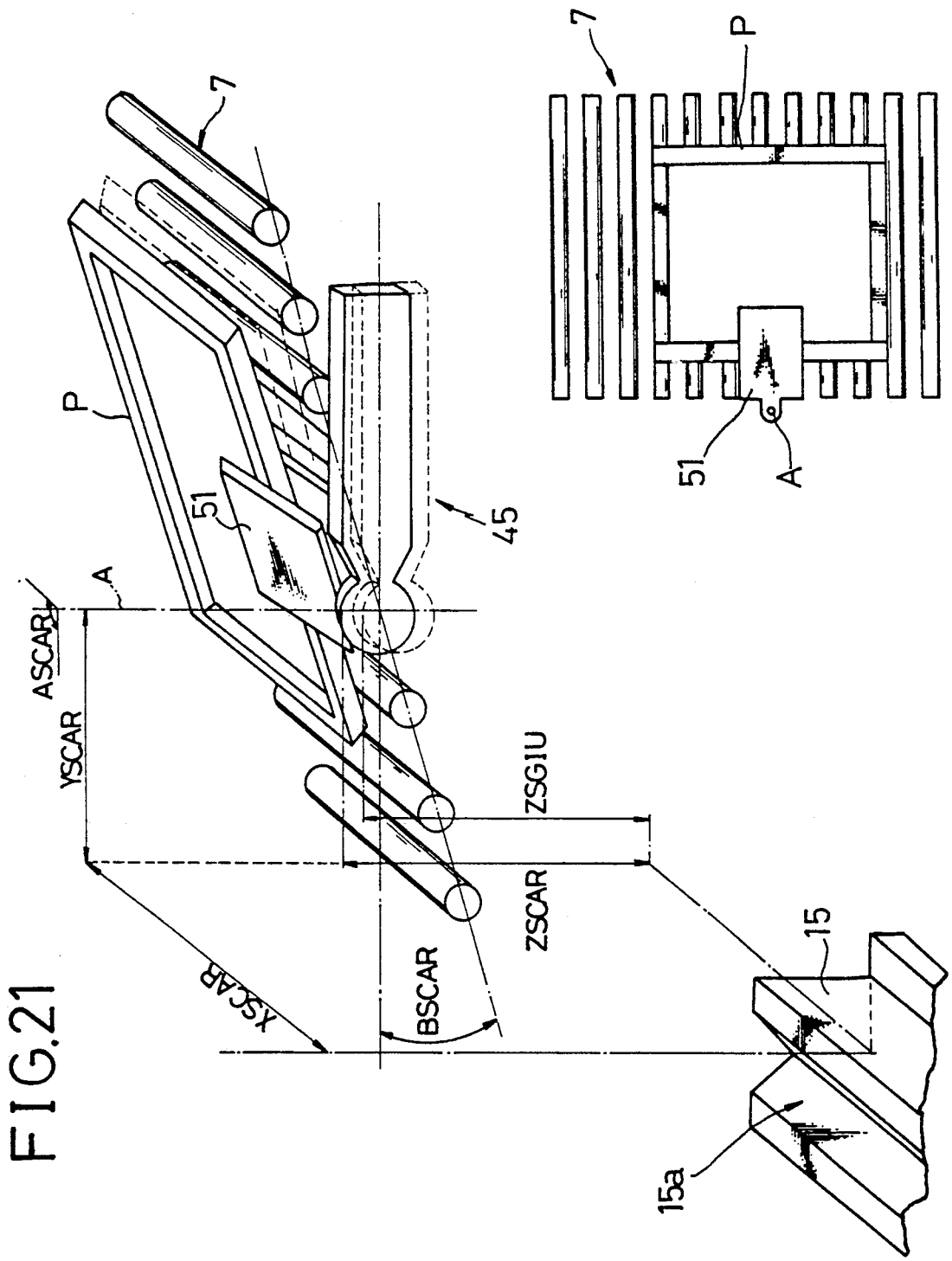

In FIG. 21, parameters relating to the die 15 and the plate clamping device 45 in the state where the product P is discharged into the transport device 7 are shown:

XSCAR, YSCAR: the distance between the first reference axis 0 and the axis A of the plate clamping device 45, measured along the X-axis and the Y-axis respectively.

ZSCAR: the distance between a prescribed point on the shaft A and the second reference axis 0', measured along the X-axis. (At this time, a product P is positioned in a position separated from the transport device 7 in the upward direction).

ZSGIU: the distance between the prescribed point on the axis A in the state where the product P is placed on the transport device 7 (indicated by the dotted line), and the second reference axis 0', measured along the Z-axis.

ASCAR, BSCAR: the angle of rotation of the jaws 51, 53 around the shaft A and shaft B respectively.

Figure 22A:
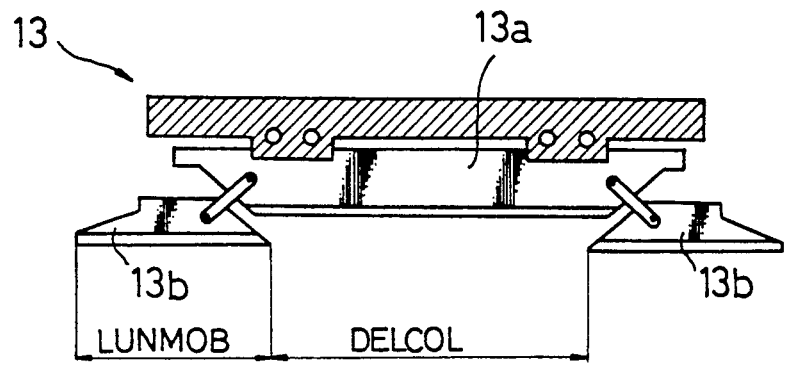
Figure 22B:
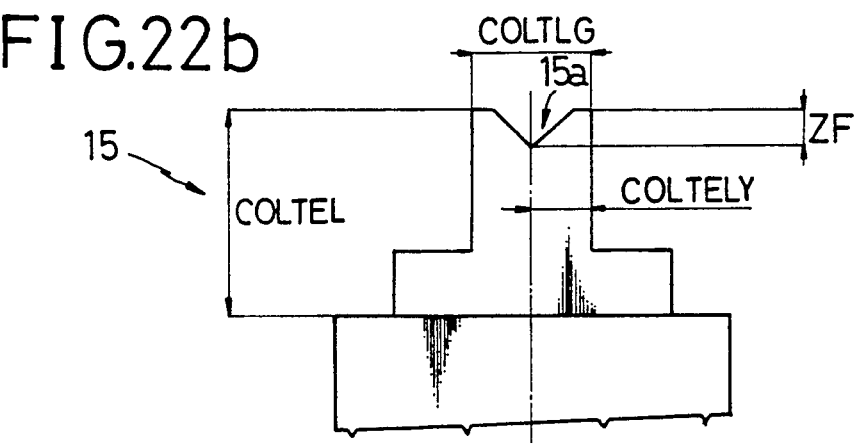

In FIG. 22, parameters relating to the dies 13, 15 are show:

DELCOL: length of the fixed section 13a of the upper die 13.

LUNMOB: length of the movable section 13b of the upper die 13.

COLTEL: height of the lower die 15.

COLTLG: width of the lower die 15.

COLTELY: distance between the bottom of the bending channel 15a and the face of the die.

ZF: the depth of the bending channel 15a.

Figures 23A, 23B:
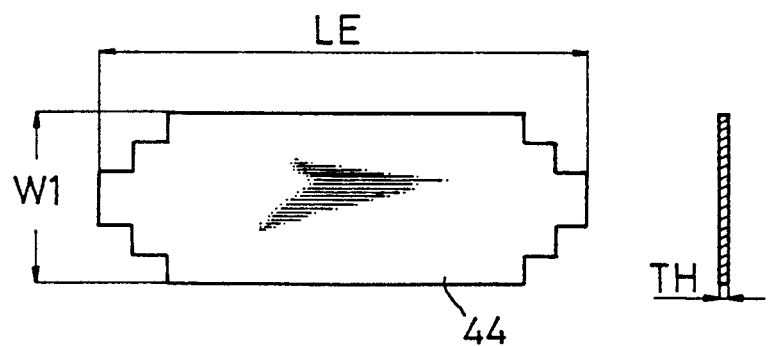

In FIG. 23, parameters relating to the plate material 44 are shown:

LE: total length of plate
WI: total width of plate
TH: thickness of plate

Figure 24:
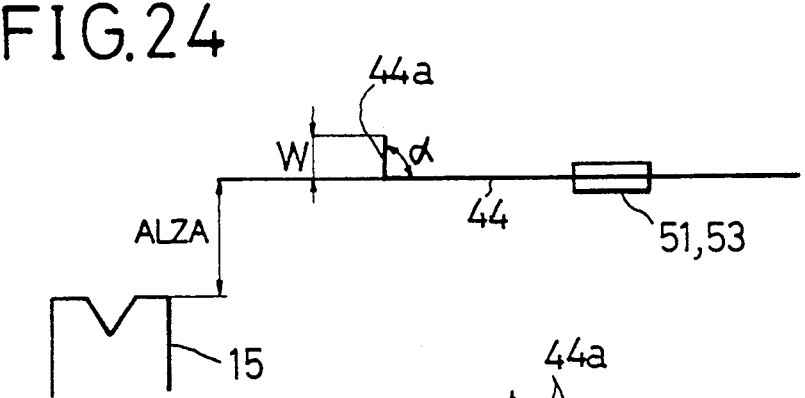
Figure 25:
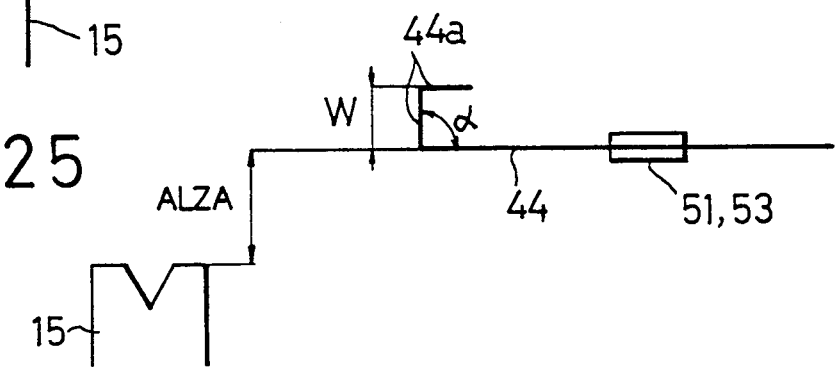

In FIG. 24 and FIG. 25, parameters relating to the die and the plate material 44 formed with the bending flange 44a are shown:

W: height of the bending flange
α: bending angle
ALZA: distance between the plate material and the surface of the lower die measured along Z-axis while the bending process is being performed.

Note that ALZA becomes large when the workpiece is flexed and the like (for example, by means of its own weight).

Figure 26:
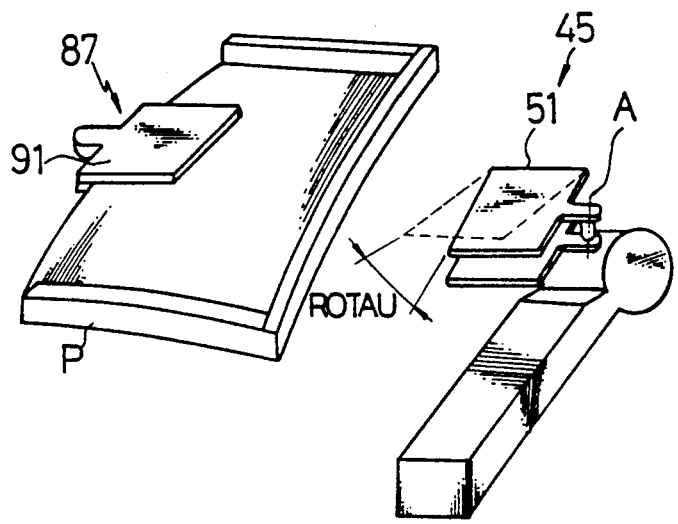
Figure 27:
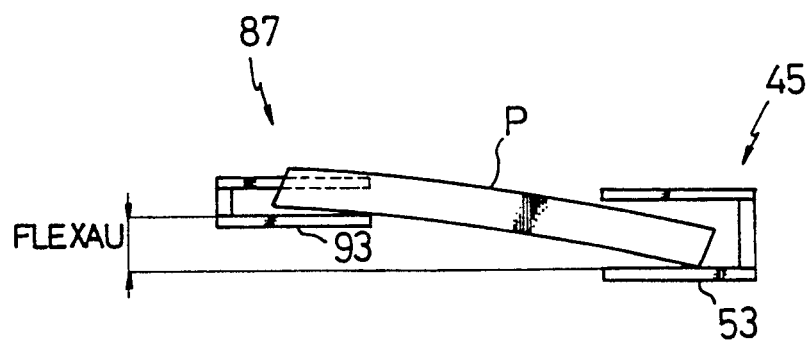

In FIG. 26 and FIG. 27, parameters relating to the plate clamping device 45 and the auxiliary plate clamping device 87 are shown:

ROTAU: the angle of rotation of the jaws 51,53 of the plate clamping device 45 to cope with the flexure in the case where the plate clamped in the auxiliary clamping device 87 flexes (for example, from its own weight), measured around the shaft B.

FLEXAU: the distance between the lower jaws 53, 93 when the plate is transferred from the auxiliary clamping device to the plate clamping device 45.

Figure 28:
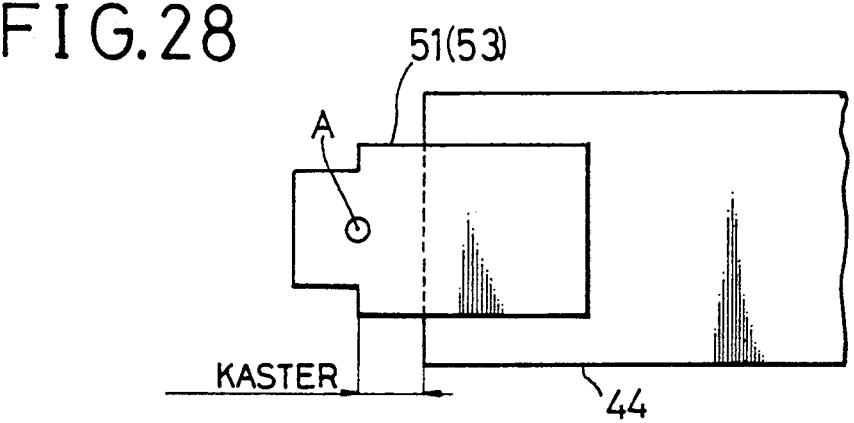
Figure 29:
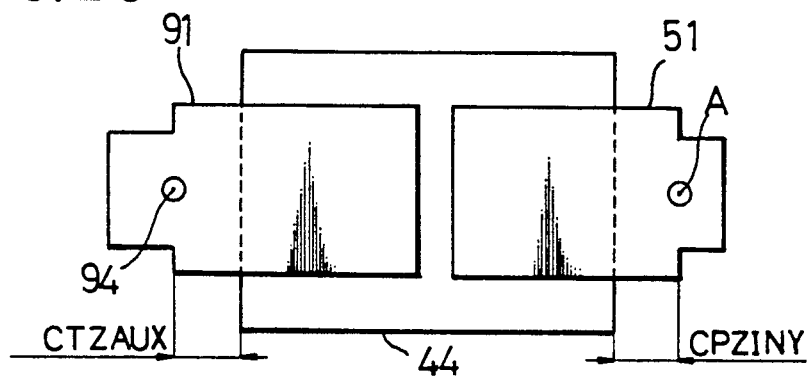
Figure 30:
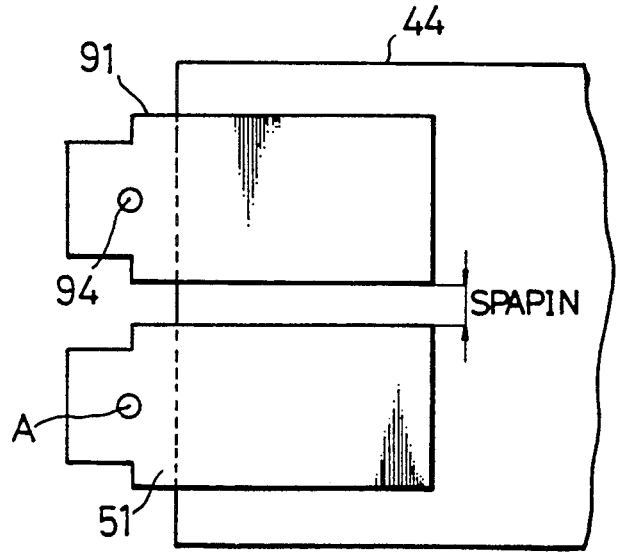

In FIGS. 28 to 30, parameters relating to the jaws 51, and 91, 93, and the plate material 44 are shown.

KASTER: distance between the axis A of rotation of the jaws 51, 53 and the end of the workpiece 44.

CPZAUX: distance between the supporting shaft 94 of the jaws 91, 93 and the end of the workpiece 44.

CPZINY distance between the jaws 51, 53 and the end of the workpiece 44.

SPAPIN: distance between the jaws 51, 53 and the jaws 91, 93 (the clamping devices 45, 89 are controlled so that this distance does not reach zero.).

Figure 31:
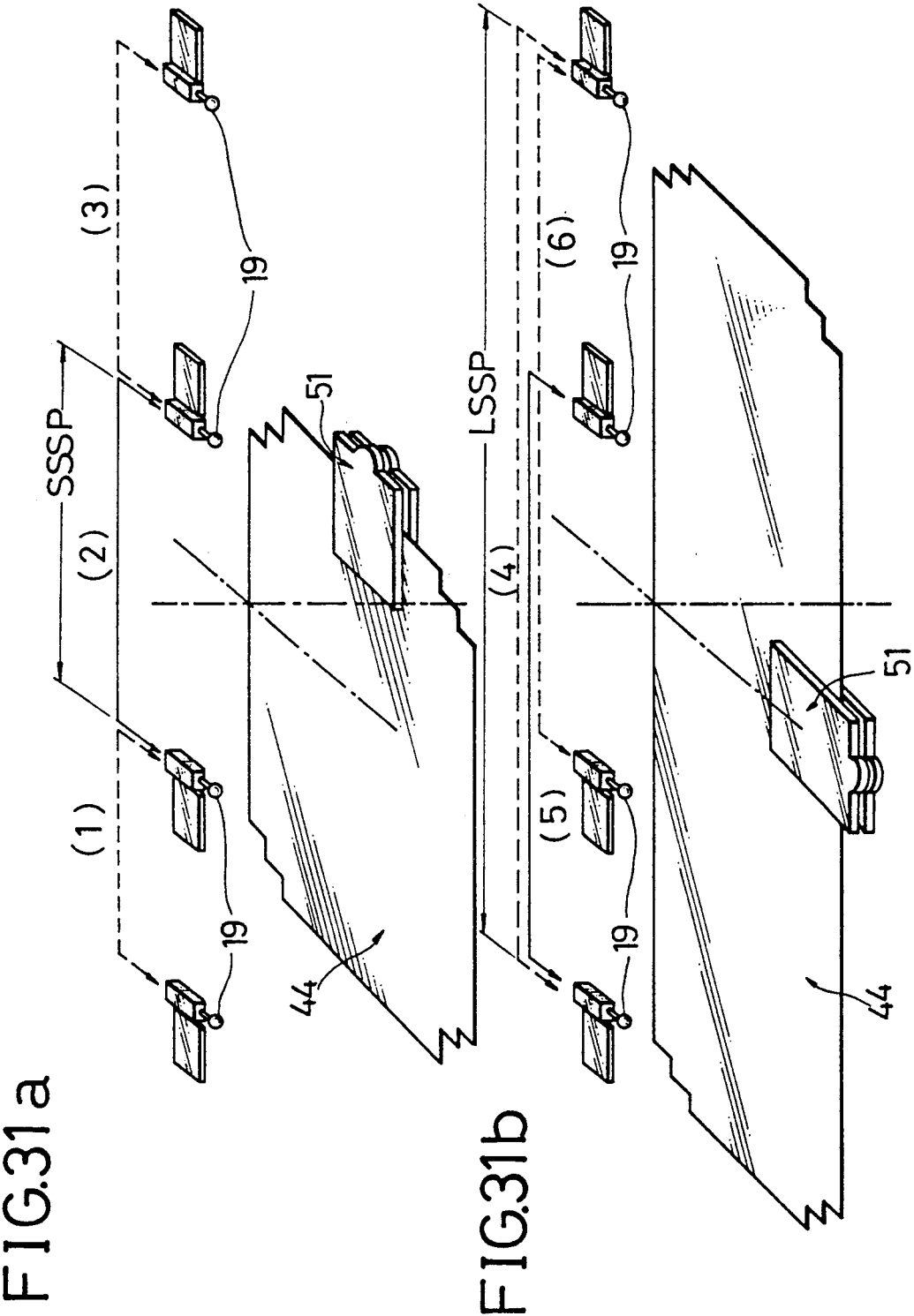
Figure 32:
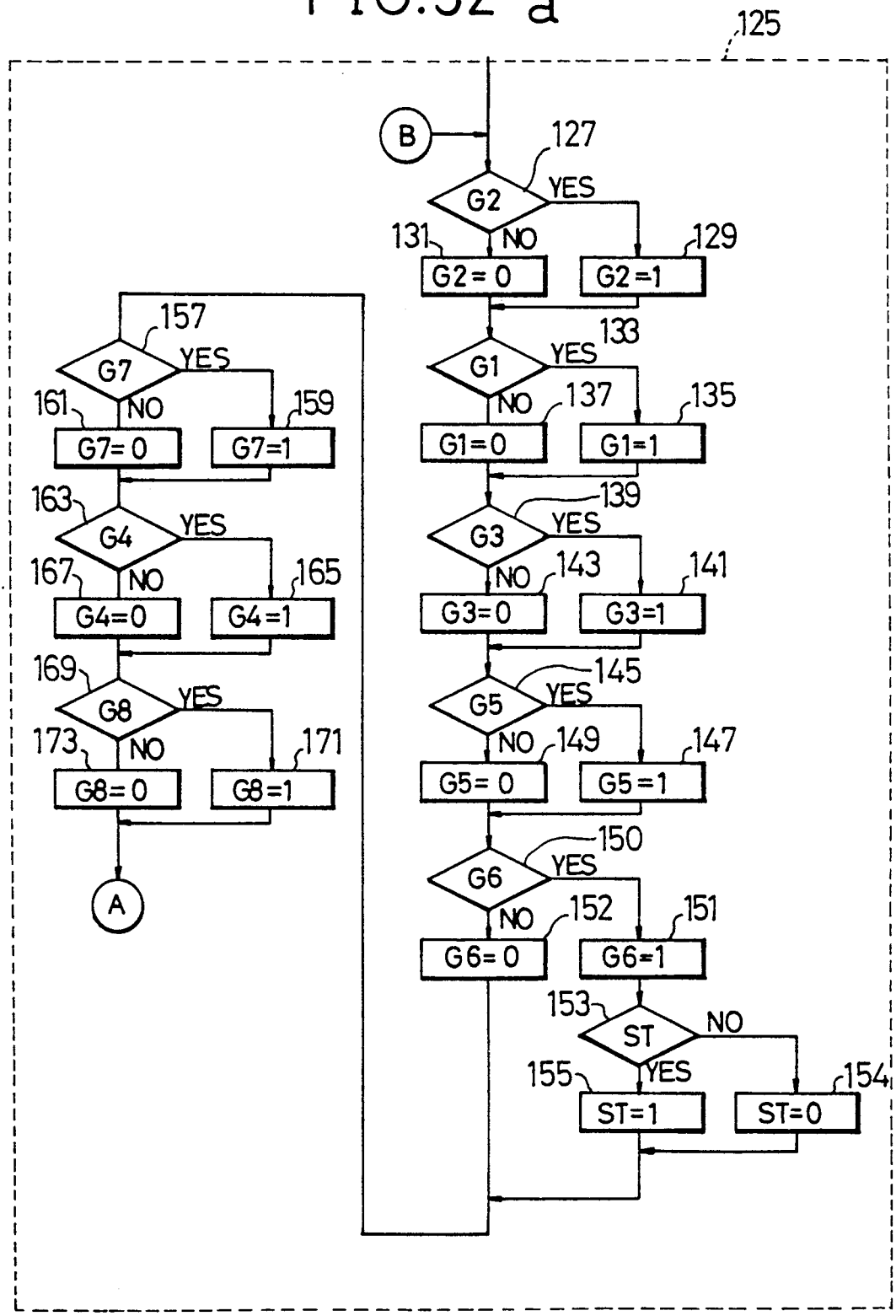
FIG. 32a,b is a detail flow charts showing parameter modification step in FIG. 17.
Figure 32:
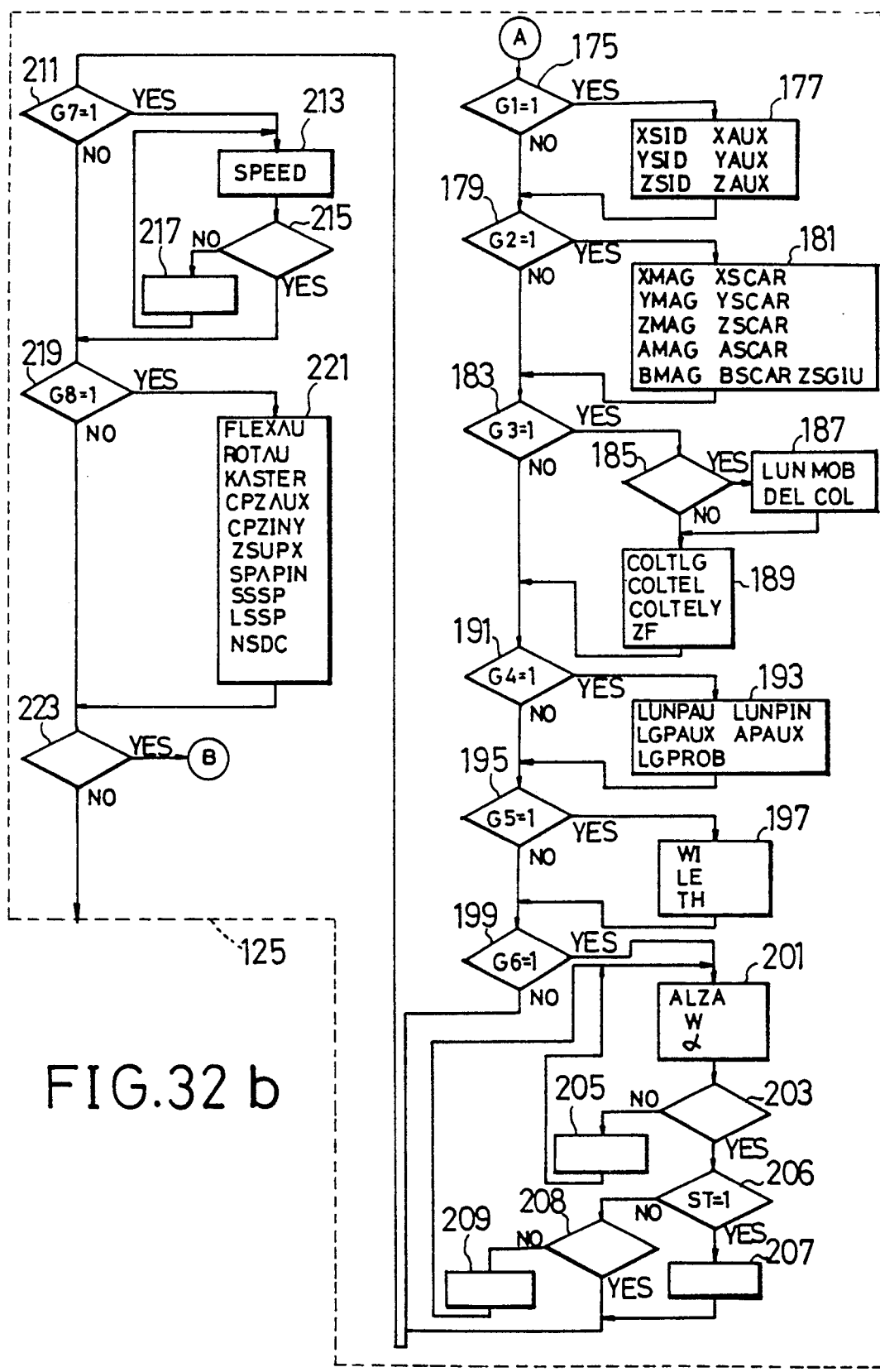

FIG. 31 shows the relationship between the sensors 19 and the plate 44. Specifically, in the case where a short side is being bent, for example, the plate is positioned at the middle two sensors 19; and in the case where a long side is being bent, it is positioned over three or four sensors. The SSSP is a parameter relating to the pair of rear sensors 19 for detecting short sides of the plate, as shown in FIG. 19a and LSSP is a parameter relating to the pair of rear sensor 19 for detecting long sides of the plate, as shown in FIG. 19b.

Again referring to FIG. 17, in the control device 97 of the present invention, the previously mentioned parameters are classified and stored in memory as follows.

G1: parameters related to the side gauge device 89 and the auxiliary clamping device 87 (XSID, YSID, ZSID, XAUX, YAUX, ZAUX).

G2: parameters related to the magazine section 5 and the transport device 7 (XMAG, YMAG, ZMAG, AMAG, BMAG, XSCAR, YSCAR, ZSCAR, ASCAR, BSACAR, ZSGIU).

G3: parameters related to the dies 13, 15 (LUNMOB, DELCOL, COLTLG, COLTEL, COLTELY, ZF).

G4: parameters related to the plate clamping device 45 parameters related to the plate material 44 (WI, LE, TH).

G6: parameters related to the bending action (ALZA, W, α)

G7: parameters related to the bending velocity (SPEED).

G8: special parameters (FLEXAU, ROTAU, KASTER, CPZAUX, CPZINY, ZSUPX, SPAPIN,, SSSP, LSSP, NSDC).

Based on this classification, the details are displayed on the display device 101 in step 123.

Next, in step 125 a check is made to see whether or not the parameters are to be modified, an the desired modifications are made to the prescribed parameters.

More specifically, as shown in FIG. 32a, first the parameters in each group from G1 to G8 are checked as to whether modification is required.

That is to say, in step 127 a check is made to see if the parameters in G2 require modification. If modification is required, the program proceeds to step 129 and G2 is set to 1; if no modification is required, the program proceeds to step 131 and G2 is set to 0.

In the same way, in steps 133 to 137, 139 to 143, 145 to 149, 150 to 155, 157 to 161, 163 to 167, 169 to 173 respectively the parameters in groups G1, G3, G5, G6, G7, G4, G8 are checked for modification requirements.

Here, in the case of checking modification requirement for the group G6, in step 153, a check is made as to whether all sides of the plate are bent in the same manner or not. In the case of positive decision, in step 154 a parameter ST is set to 1 and in the case of negative decision, in step 155, the ST is set to 0.

Next, in the sequence of steps shown in FIG. 32b the parameters are sequentially modified in groups as desired.

That is to say, in step 175 a check is made for the modification requirements of the group G1, and if modifications are required the program proceeds to step 177 where the desired modifications for the group G1 are made. In the same manner, in step 179 and 181 the group G2 parameters are modified as desired.

In steps 183, 185, after the group G3 parameters are checked for modification requirements, a judgement is made whether the upper die 13, as in FIG. 22a, is a movable die or not. In the case of a movable die, the parameters LUNMOB, DELCOL for the upper die are modified in step 187, and when not a movable die, the parameters COLTLG, COLTEL, COLTELY, and ZF only for the lower die 15 are modified in step 189.

In steps 191, 193, and steps 195, 197 the parameters for groups G4 and G5 respectively are modified as desired.

Passing through step 199 to step 201, bending parameters ALZA, W, and α corresponding to an bending stage are modified, after which a judgement is made in step 203 as to whether modifications related to all of bending stages on a side of the plate material 44 are performed or not. In the case of a negative decision, a transfer is made, in step 205, to the next stage for bending, and the program returns to step 201. In the case of positive decision being made in step 203, the program proceeds to step 206. In step 206, a judgement is made as to whether all sides of the plate 44 are bent in the same manner i.e. whether the parameter ST is 1 or not. In the case of positive decision, in step 207, the bending parameters ALZA, W, α of all sides of the plate are set to the same value as set in steps 201-205.

In the case of negative decision being made in step 206, the program proceeds to step 207 to check whether modifications related to all of the sides of the plate material 44 are performed or not.

In the case of negative decision, a transfer is made in step 209 to the next side of the plate, and the program returns to step 201.

In steps 211-217, bending speed for each bending operation is modified as desired. Here, in step 215, a check is made as to whether bending speeds for all of the bending side are modified or not.

In step 219, 221, the special parameters of group G8 are modified.

In step 223 a check is made to see if the operator has again carried out requirement for parameter modification or not. If affirmative, the program returns to step 127 and the previously explained steps are repeated.

Some of the abovementioned parameter values are obtained by direct measurement of the dimensions and the like of the plate material 44 and the plate bending machine 1. The balance are obtained by measurement of parameters while performing bending process trial. In addition, some of the parameters related to the manipulator 3 are obtained by read-out of the numerical values on the numerical control device 21 when the manipulator 3 is controlled in a prescribed position adjacent to the magazine 5 or the transport device 7.

Again referring to FIG. 17, when modifications are made to the parameters in step 125, the program proceeds to step 225.

In step 225, the position of the plate material is calculated for each bending stage, based on the abovementioned parameters and the initial position of the plate material, entered separately.

Figure 33:
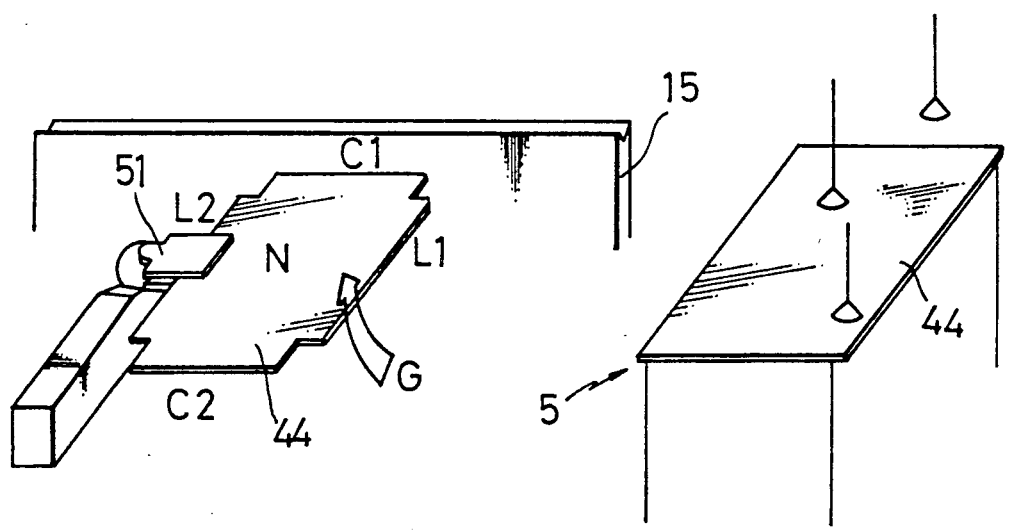
FIG. 33 illustrates initial position of the plate material in an initial bending stage.

More specifically, first, as shown in FIG. 33, the initial position of the plate material is confirmed. In FIG. 33, a short side C1 of the plate material 44 removed from the magazine 5, which is to be subjected to the initial bending process, is placed in a position opposing the lower die 15. A short side C2 is positioned on the opposite side of the lower die 15 and a long side L2 which is clamped in the jaws 51, 53 is positioned on the left side with respect to the lower die 15; opposite this, a long side L1 is positioned on the right side, a surface N is positioned facing upward, and a surface G facing downward.

An internal language (N, C1) has been created in order to specify the position of the plate material 44. By means of this internal language (N, C1) the surface N of the workpiece 44 is specified as facing upward, and the short side C1 is specified as opposing the lower die 15.

Based on the initial plate position and the transfer parameters (rotation and reversing parameters) for the plate material 44 in each bending stage which was input in step 121, the positions of the plate material 44 for the second and subsequent stages are calculated.

For example, when manufacturing the box 103 shown in FIG. 10a, as previously outlined (FIG. 12), prior to the first bending operation, because the plate material 44 is not moved, the position of the plate material 44 in the first bending stage is represented by the internal language (N, C1), as shown in FIG. 34a,b. Next, because the workpiece 44 is reversed prior to the second bending operation, the position of the workpiece 44 in the second bending stage is represented by the internal language (G, C2), as shown in FIG. 34c,d. Then, because the workpiece 44 is rotated 90 deg in the counterclockwise direction prior to the third bending operation the position of the workpiece 44 in the third bending stage is represented by the internal language (G, L1, as shown in FIG. 34,e,f. In the same way, because the workpiece 44 is rotated 180 deg prior to the fourth bending operation, the position of the workpiece 44 in the fourth bending stage is represented by the internal language (G, L2, as shown in FIG. 34g,h.

Here, it should be noted that first, a long side of the plate 44 is clumped by the manipulator and a short side thereof is bent so as to correctly ascertain the position and the movement of the plate.

These representations of the position of the plate material 44 by the internal language are stored in a memory of the control device 97 (not shown in the figures).

Again referring to FIG. 17, after the position of the plate material 44 is calculated in step 225, the program proceeds to step 227.

In step 227, the drive signal for the manipulator 3 is generated, based on the parameters for the abovementioned position of the plate material 44, and the parameters relating to the plate material 44, bending machine 1, and the manipulator and the like.

Figure 35:
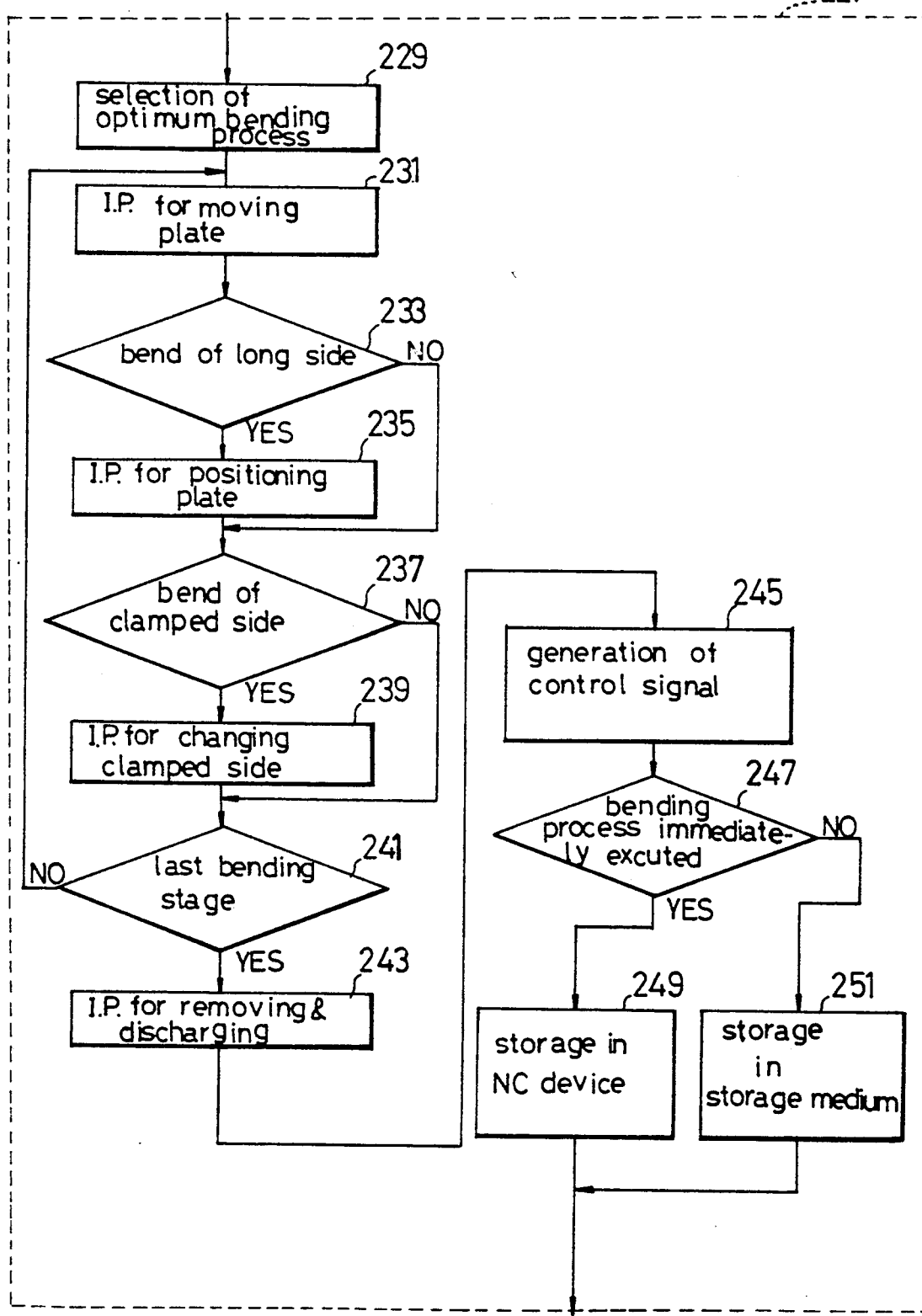
FIG. 35 is a detail flow chart showing control signal generating step in FIG. 17.

More specifically, as shown in FIG. 35, first, in step 229, a study is made to determine whether the desired product can be manufactured in the case where the bending process was carried out in accordance with the abovementioned movement (rotation, reversing) of the plate material 44 in each bending stage, starting from another initial position of the plate material 44. Then, from among all possible manufacturing processes, the optimum bending process is selected under a predetermined selection rule.

For example, in the case where the box 107 shown in FIG. 10c is to be manufactured, the following processes exist as the process starting from the initial plate position of the internal, language (N, C1).

N, C1
N, C2
G, C1
G, C1
G, C2
G, C2
N, L1
G, L1
G, L1
N, L2
G, L2
G, L2

Now, starting from the state in which the workpiece clamping device 45 is inverted around the B-zxis and the plate material 44 has a position represented by the internal language (G, C2), when the workpiece is moved in the same way as before, the next process is considered.

G, C2
G, C1
N, C2
N, C2
N, C1
N, C1
G, L1
N, L1
N, L1
G, L2
N, L2
N, L2

In Step 229, first, a study is made to determine whether or not the product can be manufactured by this process. Next, on confirming that the prescribed product can be manufactured by the abovementioned second process, the first and second processes are compared under the prescribed selection rule.

For this selection rule, for example, a process is selected in which there are few two-side reversal operations for the plate material 44, and in the case where the number of two-side reversal operations is the same, a process is selected in which there are few bends from the reversed state of the plate clamping device.

With the abovementioned first process, five reversing operations are performed, and, in the state where the plate clamping device is inverted (with the G surface up) eight bendings are carried out. In the second process, five reversing operations are performed, and, in the state where the plate clamping device is inverted (with the G surface up) five bendings are carried out. Accordingly, the second process is selected by the selection rule.

Next, in steps 231 to 241, an instruction package is decided for moving the plate material 44 to the prescribed bending position (standard position), while performing intermediate operations based on the internal language.

An explanation will now be made for the case where the first box 103 shown in FIG. 10a is manufactured.

First, in step 231, corresponding to the first bending stage, the initial top face of the plate (N) and the desired top face of the plate (N) are compared. If they are confirmed to be equivalent, the decision is made not to rotate the plate clamping device 45 around the shaft B. Following this, the initial side of the plate (C1) facing the dies 13, 15 and the desired side of the plate (C1) facing the same are compared, if they are in agreement, the decision is made not to rotate the plate clamping device 45 around the shaft A. Then, an instruction package is decided upon which does not rotate the plate clamping device around the axis A and B in the first bending stage.

Next, in step 233 the decision is made whether or not to bend the long side, and because the decision is negative (since the side C1 is going to be bent), the program proceeds to step 237.

In step 237, the decision is made whether or not to bend the side which is clamped by the plate clamping device 45. Because the decision is negative (since the side C1 is going to be bent), the program proceeds to step 241.

In step 241, the decision is made whether or not instruction packages for all bending stages have been decided. Because the decision is negative, the program returns to step 231.

In the next loop from step 231 to step 241, the instruction packgage for the second bending stage (bending of the short side C2) is determined in the same way as in the case of the first bending stage.

Specifically, in step 231, an instruction package is decided upon which rotates the plate clamping device 45 at 180 deg around the B-axis. In addition, in steps 233 and 237, an instruction package is decided upon which does not carry out the bending of the long side and the clamped side.

In the third loop from step 231 to step 241, the instruction package for the third bending stage (bending of the long side L1) is decided.

Specifically, in step 231, an instruction package is decided upon which rotates anticlockwise the plate clamping device 45 at 90 deg around the shaft A.

In step 233, because the decision to bend the long side L1 is positive, the program proceeds to step 235. In step 235, an instruction package is decided upon which positions the workpiece 44 by means of the side sensor 95, prior to bending the long side L1. Further, the package includes the instruction that the standard heights for the plate and the plate clamping device are adjusted, if desired. In step 237 an instruction package is decided upon which does not bend the clamped side.

In the fourth loop from step 231 to step 241, the instruction package for the fourth bending stage (bending of the long side L2) is decided upon. Specifically, in step 231, after the plate clamping device 45 is rotated 180° around the shaft A the instruction package is selected.

In step 233 and step 235, an instruction package is decided upon which positions the workpiece 44 by means of the side sensor 95 prior to bending the long side.

In step 237, the decision is made whether or not to bend the side which is clamped by the plate clamping device 45. Because the decision is positive, the program proceeds to step 239.

In step 239, an instruction package is decided upon which changes the side clamped by the plate clamping device 45 from side L2 to side L1. For example, while the plate is being clamped by the auxiliary clamping device 87, the long side L2 is released and the long side L1 is clamped.

Also, the instruction package in step 239 positions the workpiece 44 by means of the side sensor 95, after the workpiece 44 is clamped by the auxiliary clamping device 87.

In the positioning instruction packages decided upon in steps 233, 235 and steps 237, 239, there are included operations for revising the standard height of the plates and of the plate clamping device, if desired.

When the instruction packages for all the bending stages have been decided upon, the program proceeds to step 243 and an instruction package for removing a plate 44 from the magazine 5, and an instruction package for discharging the product P to the transport device 7 are decided upon.

Next, in step 245, based on the abovementioned instruction packages, the control signals are generated for the plate bending machine 1, and the manipulator 3 and the auxiliary clampng device 87 and the like. More specifically, based on the abovementioned instruction package, which includes standard instruction for moving the plate clamping device between the characteristic positions, a program related to the movement between characteristic positions is read out from the memory means 122, and consideration is given to the abovementioned input parameters related to the dimensions of the structural elements of the plate bending machine 1 and the like. Then, definite control signals for the manipulator and the like are generated. Here, consideration is given to the abovementioned input parameters, for example, in a range which does not conflict with the manipulator and the plate bending machine, with the object of minimizing the distance the manipulator moves.

In step 247, a decision is made as to whether the bending process can immediately be executed by the control signal or not. If affirmative, the program proceeds to step 249 and an action program including the control signal is stored in a memory of the numerical control device 21. If negative, the program proceeds to step 251 and an action program including the control signal and the abovementioned various parameters are stored in the prescribed storage medium.

Again referring to FIG. 17, when the control signal is created in step 227, the program proceeds to step 253. In step 253, the manipulator 3 and the like are controlled according to the control signal. Then the plate withdrawal, the plate bending process, and the product discharge are carried out.

Figure 36:
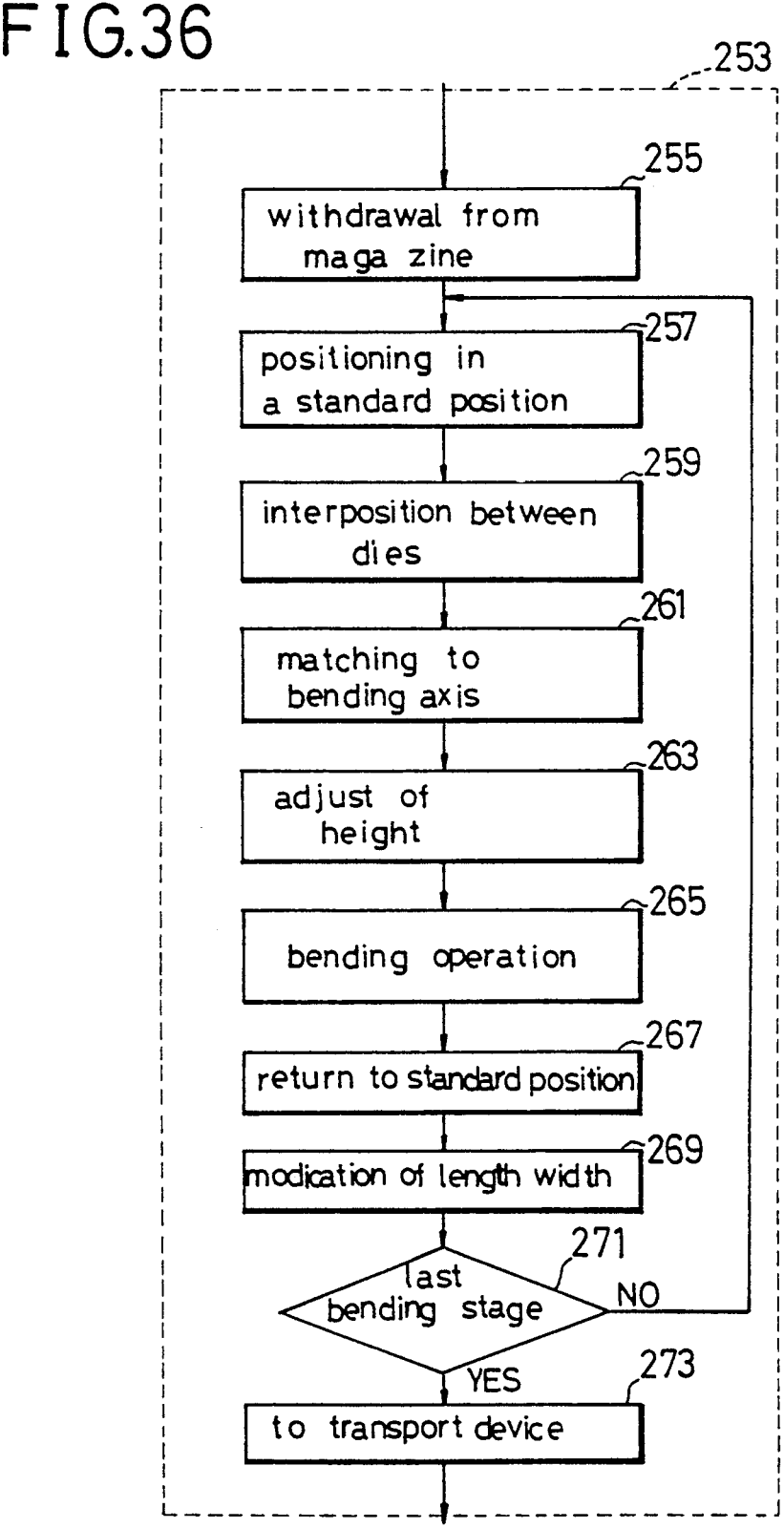
FIG. 36 is a detail flow chart showing manipulator controlling step in FIG. 17.

More specifically, as shown in FIG. 36, first, in step 255, a plate is withdrawn from the magazine 5 by the manipulator 3.

In step 257, the plate clamping device is rotated, reversed around the shaft A and the shaft B, and the workpiece 44 is positioned in the desired standard position.

In step 259, the workpiece 44 is interposed between the dies 13, 15. Here, the height of the workpiece 44 with respect to the lower die 15 is given the value of the parameter ALZA.

In step 261, the side of the workpiece 44 to be bent is matched to the bending line of the dies 13, 15 by means of the signal from the sensor 19.

In step 263, the height of the position of the workpiece 44 is adjusted according to the signal from the sensor 19.

In step 265, the upper die 13 or the lower die 15 is operated to bend the workpiece 44, and the manipulator 3 is moved to follow the movement of the edge of the workpiece 44.

In step 267, after the bending process is completed, the plate clamping device 45 returns to the prescribed standard position.

In step 269, the modification of the length of the plate material 44 and the like are made. For example, as shown in FIG. 37, the length of the right side section of the plate material 44 clamped by the jaws 51, 53, prior to bending the flange, is LD, but after the flange is bent this becomes LD'. Accordingly, in this step 269, after the flange is bent, the length of the plate material 44 on the right side of the jaw is calculated as $$LD' = LD - (\text{flange height}) + (\text{plate thickness}).$$

In step 271, a judgement is made as to whether this is the final bending stage or not. If it is not the final bending stage the program returns to step 257.

The loop made up of the steps 257 to 271 is executed continuously for each bending stage. When the bending stages are all completed, including the last bending stage, an affirmative judgement is made at step 271 and the program proceeds, to step 273.

Then, in step 273, the product is discharged to the transport device 7 and the bending operations are completed.

Now referring to FIG. 38, in the case where the boxes shown in FIG. 10b are manufactured, the bending process on the plate material 44 under the control signal of the manipulator 3 is shown.

First, the plate is removed from the magazine 5, the short side of the plate is interposed between the upper die 13 and the lower die 15 (FIG. 38a), and the first flange 275 is processed (FIG. 38b).

Next, the same short side of the plate material is interposed between the upper die 13 and the lower die 15 (FIG. 38c), and the second flange 277 is processed (FIG. 38d).

Next, the jaws 51, 53 are rotated 180 deg around the axis A (FIG. 38e), and the short side opposite the short side which was bent, is bent twice in succession (FIG. 38f, g, h, i).

Next, after the jaws 51, 53 are rotated 90 deg around the axis A (FIG. 38l), the workpiece is positioned by the side sensor 95, and height revision is performed as required (FIG. 38m).

Next, the long side is freely interposed between the upper die 13 and the lower die 15, and the bending is performed twice in succession (FIG. 38n, o, p, q).

Next, the jaws 51, 53 are rotated 90 deg around the axis A, and the same long side clamped in the jaws 51, 53 is clamped in the jaws 91, 93 (FIG. 38r, s).

Next, the jaws 51, 53, after the plate material 44 is temporarily removed, are rotated 180 deg around the axis A, and the long side which has already been bent is clamped (FIG. 38t).

Next, the workpiece 44 is removed from the jaws 91, 93, and after the jaws 51, 53 are rotated 90 deg around the axis A, the workpiece is positioned by the side sensor 95, and the height is revised as required (FIG. 38u).

Next, the long side is freely interposed between the upper die 13 and the lower die 15, and the bending is performed twice in succession (FIGS. 38v, w, x, y).

Next, the jaws 51, 53 are rotated 90 deg around the axis A, and the product is discharged to the transport device 7.

With the above embodiment of the present invention, when the prescribed parameters are input, a schematic diagram of the shape of each bending stage of the plate material 44 and the like is displayed on the display device so that a check of the correctness of the input parameters can easily be made.

In addition, the parameters of the bending process, product shape, characteristics of the plate bending machine, and the like, can easily be modified, so that a variety of products can easily be manufactured.

Further, in this embodiment of the present invention, the control device 97 can, of course, also be incorporated in the numerical control device 21 provided in the plate bending machie 1.

As in the above explanation, in the plate bending device using the present invention, various shapes of products can easily be manufactured by simple instructions, such as inputting of the angle of rotation and the requirement for reversal of the plate in each bending stage; this is because the positions of the plate material 44 in the second and subsequent bending stages are consecutively calculated based on the position of the plate material 44 in the initial bending stage and the angle of rotation and the requirement for reversal of the plate in each bending stage.

Here, a control method for the case where the storage medium 100b is used for parameter input means in the CPU 99,,will be described briefly.

In this case, instruction information corresponding to a prescribed shape of a product is input from the storage medium 100b at step 121 (FIG. 17). In the step 121, the shape of the product is displayed on the display device 101, if desired.

In step 123 and step 125, the parameters included in the groups G1-G8 are modified as desired in the same manner as explained above.

Step 225 and steps 229-243 are skipped.

In step 245, the manipulator control signal is generated in the same way as described above; here, the programs related to the movement between characteristic positions is read out from the storage medium 100b.

In steps 249-251, the manipulator control signal is stored in the memory of numerical control device 21 or the prescribed storage medium, which may be the storage medium 100b. Operation in step 227 is same as before.

In the case where the storage medium such as floppy disk is used for input means for inputting parameters, various shapes of products are easily manufactured by changing the storage medium.

What is claimed is:

1. A device for controlling a manipulator for handling a workpiece processed by a press brake which is equipped with a side sensor for detecting a position of the workpiece in a horizontal X-axis direction parallel to a longitudinal direction of upper and lower dies of the press brake, the manipulator being arranged to be movable in the X-axis direction, and a head of the manipulator being arranged to be rotatable about a first shaft and a second shaft of the manipulator, comprising:
    means for inputting a position of the workpiece for an initial bending stage;
    means for inputting an angle of rotation of the workpiece about the first and/or the second shafts of the manipulator for each of a plurality of bending stages;
    means for sequentially calculating a position of the workpiece for the second and subsequent bending stages, based on the initial position of the workpiece which is input from the workpiece initial position input means, and the angle of rotation of the workpiece about the first and/or the second shafts at each of the bending stages which is input from the workpiece rotation angle input means;
    means for producing a first instruction data for rotating the workpiece about the first and/or the second shafts of the manipulator for each of the bending stages, based on the position of the workpiece at each of the bending stages; and
    means for producing second instruction data for detecting a position of the workpiece in the X-axis direction by means of the signal from the side sensor at a bending stage for bending a long side of said workpiece.

2. The control device of claim 1, wherein the input means (102) enters parameters which comprises:
    (a) parameter (113a) for rotation of the workpiece 180 deg in a horizontal plane;
    (b) parameter (113b) for reversal of the workpiece;
    (c) parameter (113c) for performing the actions in (a) and (b) simultaneously;
    (d) parameter (113d) for rotation of the workpiece 90 deg clockwise in a horizontal plane;
    (e) parameter (113e) for rotation of the workpiece 90 deg counterclockwise in a horizontal plane; and
    (f) parameter (11f) for performing neither rotation nor reversal.

3. The control device of claim 1, wherein
    the bending angle and the bending width can be entered through the input means (102); and
    the bending shape of the workpiece (44) at each stage based on the input data can be displayed.

4. The control device of claim 1, further comprising:
    a memory means for recording modificable parameters relating to members of the plate bending machine or the manipulator; and
    a display means (101) for displaying the parameters recorded in the memory means.

5. The control device of claim 4, further comprising a parameter modification means (102) wherein at least one parameter among the length parameters and angle parameters stored in the memory means can be modified.

6. The control device of claim 1, wherein the position of the workpiece is represented by the plate surface which faces upward, and by the side facing the plate bending device.

7. The control device of claim 1, wherein the workpiece is positioned at each bending stage so that the short side is subjected to the bending process before the long side.

8. The control device of claim 1, further comprising a control signal generating means which can, by variously modifying the position of the workpiece in the initial bending stage while fixing the angle of rotation of the workpiece and the requirement for reversal at each bending stage, create various cycles for the position of the workpiece in each bending stage, and can select a desired cycle from among these cycles based on a prescribed selection rule.

9. The control device of claim 1, further comprising means for revising the position of the workpiece in the second and the subsequent bending stages, based on a signal from a sensor provided close to the plate bending machine, for detecting the position of the workpiece.

10. The control device of claim 1, further comprising control signal generating means having transfer control data for transferring the manipulator between standard positions and the control signal generating means (121)

calls the transfer control data based on plate position data for each bending stage when the drive control signal is generated.

11. The device of claim 1, further comprising:
drive control signal generating means for generating a drive control signal for a manipulator, based on the position of the workpiece at each bending stage and the data for the dimensions of the members of the plate bending machine.

12. The device of claim further comprising:
means for receiving instruction information on a shape of a product from a storage medium (100b), and
control signal generating means (121) for generating a control signal for a manipulator, based on the instruction information and a plurality of parameters for dimensions of a plurality of members for the plate bending machine.

13. A method for controlling a manipulator for handling a workpiece processed by a press brake which is equipped with a side sensor for detecting a position of the workpiece in the horizontal X-axis direction parallel to the longitudinal direction of upper and lower dies of the press brake, the manipulator being arranged to be movable in the X axis direction, and a head of the manipulator being arranged to be rotatable about a first shaft and a second shaft, comprising the steps of:
(a) inputting a position of the workpiece for an initial bending stage;
(b) inputting an angle of rotation of the workpiece about the first and/or the second shafts of the manipulator for each of a plurality of bending stages;
(c) sequentially calculating a position of the workpiece for the second and subsequent bending stages, based on the initial position of the workpiece input at the step (a), and the angle of rotation of the workpiece about the first and/or the second shafts of the manipulator at each of the bending stages which is input at the step (b);
(d) producing a first instruction data for rotating the workpiece about the first and/or the second shafts of the manipulator for each of the bending stages, based on the position of the workpiece at each of the bending stages;
(e) producing second instruction data for detecting a position of the workpiece in the X-axis direction by means of the signal from the side sensor at a bending stage for bending a long side of said workpiece.

14. A device for controlling a manipulator for handling a workpiece processed by a press brake which is equipped with a back gauge sensor for detecting a position of the workpiece in a horizontal Y-axis direction perpendicular to a longitudinal direction of upper and lower dies of the press brake, the manipulator being arranged to be movable in the Y-axis direction, and a head of the manipulator being arranged to be rotatable about a first shaft and a second shaft of the manipulator, comprising:

(a) means for inputting a position of the workpiece for an initial bending stage;
(b) means for inputting an angle of rotation of the workpiece about the first and/or the second shafts of the manipulator for each of a plurality of bending stages;
(c) means for sequentially calculating a position of the workpiece for the second and subsequent bending stages, based upon the initial position of the workpiece which is input from the workpiece initial position input means, and the angle of rotation of the workpiece about the first and/or second shafts at each of the bending stages which is input from the workpiece rotation angle input means;
(d) means for producing an instruction data for rotating the workpiece about the first and/or the second shafts of the manipulator at each of the bending stages, based on the position of the workpiece at each of the bending stages; and
(e) a numerical control means for positioning the side of the workpiece to be bent with respect to the upper and the lower die by means of a detection signal from the back gauge sensor.

15. A method of controlling a manipulator for handling a workpiece processed by a press brake which is equipped with a back gauge for detecting a position of the workpiece in a horizontal Y-axis direction perpendicular to a longitudinal direction of upper and lower dies of the press brake, the manipulator being arranged to be movable in the Y-axis direction, and a head of the manipulator being arranged to be rotatable about a first shaft and a second shaft of the manipulator, comprising the steps of:
(a) inputting a position of the workpiece for an initial bending stage;
(b) inputting an angle of rotation of the workpiece about the first and/or the second shafts of the manipulator for each of a plurality of bending stages;
(c) sequentially calculating a position of the workpiece for the second and subsequent bending stages, based upon the initial position of the workpiece which is input at the step (a), and the angle of rotation of the workpiece about the first and/or the second shafts of the manipulator at each of the bending stages which is input at the step (b);
(d) producing an instruction data for rotating the workpiece about the first and/or the second shafts of the manipulator for each of the bending stages, based on the position of the workpiece at each of the bending stages;
(e) rotating the workpiece about the first and/or the second shafts of the manipulator at each of the bending stages in accordance with the instruction data produced at the step (d); and
(f) positioning the side of the workpiece to be bent with respect to the upper and the lower die by means of a detection signal from the back gauge sensor.

* * * * *

UNITED STATES PATENT AND TRADEMARK OFFICE
CERTIFICATE OF CORRECTION

PATENT NO. : 5,005,394
DATED : April 9, 1991
INVENTOR(S) : Franco SARTORIO et al It is certified that error appears in the above-identified patent and that said Letters Patent is hereby corrected as shown below:

ON TITLE PAGE:

Assignee should read --Amada Company, Limited, Japan--.

Column 11, line 31, "show:" should be --shown:--;

Column 12, line 1, after "51," insert --53--;
      line 36, after "45" insert --(LUNPAU, LGPAUX, LGPROB, LUNPIN, APAUX). G5:--.

UNITED STATES PATENT AND TRADEMARK OFFICE
CERTIFICATE OF CORRECTION

PATENT NO. : 5,005,394

DATED : April 9, 1991

INVENTOR(S) : Franco SARTORIO et al

It is certified that error appears in the above-identified patent and that said Letters Patent is hereby corrected as shown below:

IN THE CLAIMS:

COLUMN 20;
    Claim 2, line 25, "(11f) should be --(113f)--.

COLUMN 21;
    Claim 12, line 10, "The device of claim further comprising:" should read --The device of claim 1, further comprising:--.

Claim 13, line 25, "X axis" should be --X-axis--.

Signed and Sealed this

Twenty-fourth Day of November, 1992

Attest:

DOUGLAS B. COMER

Attesting Officer

Acting Commissioner of Patents and Trademarks